United States Patent
Xu et al.

(10) Patent No.: US 10,448,325 B2
(45) Date of Patent: Oct. 15, 2019

(54) DEVICE AND METHOD FOR TRANSMITTING AND RECEIVING DATA TO AND FROM TERMINAL IN WIRELESS COMMUNICATION SYSTEM

(71) Applicant: Samsung Electronics Co., Ltd., Suwon-si, Gyeonggi-do (KR)

(72) Inventors: Jiangwei Xu, Suwon-si (KR); Kyeng-Hun Lee, Seoul (KR); Jin-Hyoung Kim, Seongnam-si (KR); Jin-Ho Lee, Seoul (KR); Krishna Manohar Singh, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 15/512,389

(22) PCT Filed: Oct. 2, 2015

(86) PCT No.: PCT/KR2015/010423
§ 371 (c)(1),
(2) Date: Mar. 17, 2017

(87) PCT Pub. No.: WO2016/053045
PCT Pub. Date: Apr. 7, 2016

(65) Prior Publication Data
US 2017/0280386 A1    Sep. 28, 2017

(30) Foreign Application Priority Data

Oct. 2, 2014 (KR) .................. 10-2014-0133161

(51) Int. Cl.
*H04L 12/741* (2013.01)
*H04L 29/08* (2006.01)
(Continued)

(52) U.S. Cl.
CPC ..... *H04W 52/0212* (2013.01); *H04L 61/1511* (2013.01); *H04L 61/2007* (2013.01);
(Continued)

(58) Field of Classification Search
None
See application file for complete search history.

(56) References Cited

U.S. PATENT DOCUMENTS 9,131,032 B1 * 9/2015 Gupta ............... H04W 8/20
2005/0204039 A1 * 9/2005 Douglis ........... H04L 29/12066
709/225

(Continued)

FOREIGN PATENT DOCUMENTS

| KR | 100765238 B1 | 10/2007 |
| KR | 20140036981 A | 3/2014 |
| KR | 20140115197 A | 9/2014 |

*Primary Examiner* — Duc T Duong
(74) *Attorney, Agent, or Firm* — Jefferson IP Law, LLP

(57) ABSTRACT

The present disclosure relates to a device and method for transmitting and receiving data to and from a terminal in a wireless communication system. The method of operating the terminal in the wireless communication system may include the processes of comparing pre-stored domain name service (DNS) cache information with DNS inquiry information in a DNS inquiry if the DNS inquiry on a host is received from a uniform resource locator (URL) protocol handler, and transmitting internet protocol (IP) address information corresponding to the host to the URL protocol handler according to a compared result.

18 Claims, 27 Drawing Sheets

(51) Int. Cl.
  *H04W 80/12* (2009.01)
  *H04W 52/02* (2009.01)
  *H04L 29/12* (2006.01)

(52) U.S. Cl.
  CPC ......... *H04L 61/6009* (2013.01); *H04L 67/02* (2013.01); *H04L 67/2842* (2013.01); *Y02D 70/1262* (2018.01); *Y02D 70/142* (2018.01); *Y02D 70/26* (2018.01)

(56) References Cited

U.S. PATENT DOCUMENTS

| | | | |
|---|---|---|---|
| 2010/0023611 A1* | 1/2010 | Yang | H04L 29/12066 709/223 |
| 2011/0153867 A1* | 6/2011 | van de Ven | H04L 29/12811 709/245 |
| 2012/0124239 A1* | 5/2012 | Shribman | H04L 61/1511 709/245 |
| 2012/0179801 A1 | 7/2012 | Luna et al. | |
| 2012/0324094 A1* | 12/2012 | Wyatt | H04W 4/60 709/224 |
| 2013/0031626 A1* | 1/2013 | Kim | H04L 63/1458 726/22 |
| 2013/0086142 A1 | 4/2013 | Hampel et al. | |
| 2013/0173795 A1* | 7/2013 | McPherson | H04L 63/168 709/225 |
| 2014/0082172 A1* | 3/2014 | Chueh | H04L 61/1511 709/223 |
| 2014/0089523 A1* | 3/2014 | Roy | H04L 45/04 709/242 |
| 2014/0173123 A1* | 6/2014 | Graessley | H04L 61/6086 709/228 |
| 2015/0032869 A1* | 1/2015 | Chan | H04L 67/26 709/221 |
| 2015/0058488 A1* | 2/2015 | Backholm | H04L 61/1511 709/226 |
| 2015/0220943 A1* | 8/2015 | Dossick | G06Q 30/0201 705/7.29 |

* cited by examiner

DEVICE AND METHOD FOR TRANSMITTING AND RECEIVING DATA TO AND FROM TERMINAL IN WIRELESS COMMUNICATION SYSTEM

CROSS-REFERENCE TO RELATED APPLICATION AND CLAIM OF PRIORITY

The present application is a U.S. National Stage application under 35 U.S.C. § 371 of an International application filed on Oct. 2, 2015 and assigned application number PCT/KR2015/010423, which claimed the benefit of a Korean patent application filed on Oct. 2, 2014 in the Korean Intellectual Property Office and assigned Serial number 10-2014-0133161, the entire disclosures of which are hereby incorporated by reference.

TECHNICAL FIELD

The present disclosure relates to a method and apparatus for transmitting and receiving data by a terminal in a wireless communication system.

BACKGROUND

A terminal (e.g., a portable terminal) that supports multiple radio access technology (e.g., Long Term Evolution (LTE), wireless LAN (Wi-Fi), and the like) may perform an HTTP session through a communication interface that supports a corresponding radio access technology, in order to perform downloading through Wi-Fi and LTE.

Before executing an HTTP session, a portable terminal may need to preferentially obtain a host IP address corresponding to a host name from a domain name service (DNS) server. As described above, a procedure that obtains an IP address is referred to as a DNS resolution. The portable terminal transmits a DNS query to a DNS server to obtain an IP address, and receives a DNS response including the IP address in response to the transmission. The DNS query may be transmitted through a communication interface that is determined (automatically selected) by default in the portable terminal.

This may bring about several issues. For example, when different communication interfaces use different IP versions, the transmission speed of the communication interface determined by default is slower than the transmission speed of another communication interface. For example, when two or more types of communication interfaces are used and IP versions of the communication interfaces are different from each other, a portable terminal may transmit a DNS query through a communication interface that does not support an IP version of a desired host server, and thus, an erroneous result may occur in association with the DNS resolution.

Also, when the communication interface determined by default has a relatively slower speed than another communication interface, an amount of time expended for the DNS resolution may become long.

Also, when a portable terminal that supports two or more types of communication interfaces transmits a DNS query through the two or more types of communication interfaces, a DNS resolution may be obtained through any one of the communication interfaces, but may waste power since another communication interface is continuously activated. Also, although a portable terminal obtains a DNS resolution in association with a DNS query through a first communication interface having a high transmission speed from among communication interfaces, a response to an HTTP request may not be quickly received through a second communication interface when the HTTP request is transmitted through the second communication interface which has a low transmission speed.

SUMMARY

Various embodiments of the present disclosure provide an apparatus and method for effectively performing a DNS resolution by minimizing power consumption in a portable terminal that supports a multiple radio access technology (multi-RAT).

According to an embodiment of the present disclosure, there is provided an operation method of a terminal in a wireless communication system. The method includes if a domain name service (DNS) query associated with a host is received from a uniform resource locator (URL) protocol handler, comparing previously stored DNS cache information and DNS query information included in the DNS query, and transmitting Internet Protocol (IP) address information corresponding to the host to the URL protocol handler according to a result of the comparison.

BRIEF DESCRIPTION OF THE DRAWINGS

The following description is made with reference to the accompanying drawings for a more complete understanding of the present disclosure and effects thereof, and the same reference numerals indicate the same parts.

DETAILED DESCRIPTION

In the present disclosure, FIGS. 1 to 26 which are used for describing the principles of the present disclosure are merely for illustrative purposes, and should not be construed as anything that limits the scope of the disclosure. Those skilled in the art can understand that the principles of the present disclosure can be implemented in any properly arranged wireless communication system.

Figure 1:
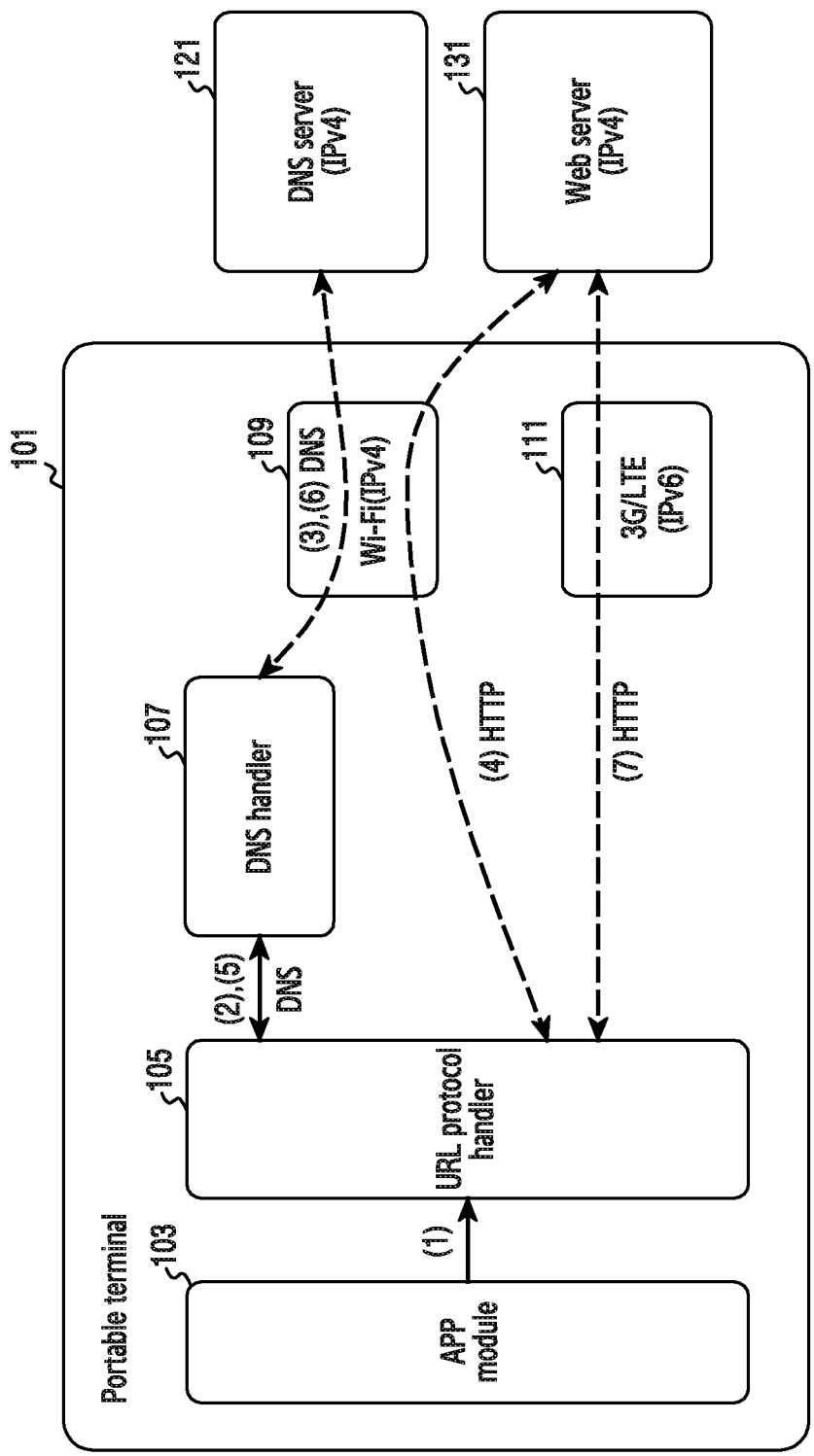
FIG. 1 is a diagram illustrating a DNS resolution operation performed through communication interfaces that support Wi-Fi and 3G/LTE in a portable terminal according to a related art of the present disclosure.

FIG. 1 is a diagram illustrating a DNS resolution operation performed through communication interfaces that support Wi-Fi and 3G/LTE in a portable terminal according to a related art of the present disclosure. Referring to FIG. 1, a portable terminal 101 may include an application (APP) module 103, a uniform resource locator (URL) protocol handler 105, a DNS handler 107, a Wi-Fi communication interface 109, and a 3G/LTE communication interface 111.

The application module 103 may request a host access (HTTP request) from the URL protocol handler 105 (Step 1).

The URL protocol handler 105 may perform a DNS resolution corresponding to IPv4 through the previously set Wi-Fi communication interface 109 and the DNS handler 107, together with the DNS server 121, and may access a web server 131 through the Wi-Fi communication interface 109 based on an IP address of a host obtained through the DNS resolution (Steps 2, 3, and 4)). When a host HTTP request is received for the second time in the state in which the 3G/LTE communication interface 111 is activated, the URL protocol handler 105 may perform a DNS resolution corresponding to IPv4 through the DNS handler 107 and the Wi-Fi communication interface 109, thereby obtaining the IP address of the host of which a IP version is IPv4 (Steps 5 and 6). Subsequently, when the URL protocol handler 105 attempts to transmit an HTTP request to the IPv4 web server 131 through the 3G/LTE communication interface 111 of which an IP version is IPv6, the HTTP request may fail due to a difference in IP versions between the 3G/LTE communication interface 111 and the web server 131 (Step 7).

Figure 2:
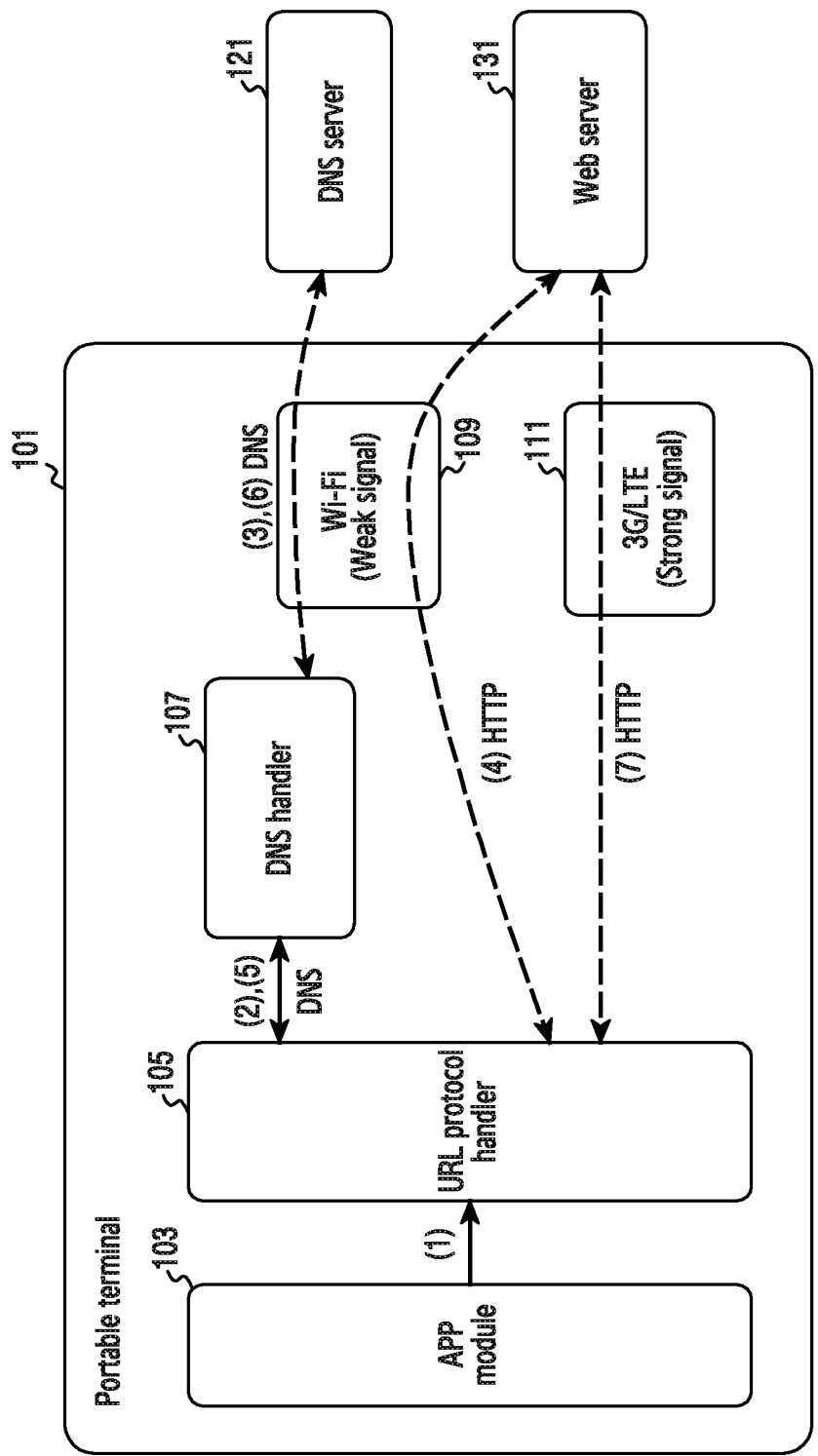
FIG. 2 is a diagram illustrating a DNS resolution operation performed through communication interfaces that support Wi-Fi and 3G/LTE in a portable terminal according to a related art of the present disclosure.

FIG. 2 is a diagram illustrating a DNS resolution operation performed through communication interfaces that support Wi-Fi and 3G/LTE, in a portable terminal according to a related art of the present disclosure. Here, it is assumed that a Wi-Fi communication interface may have a weak signal, and a 3G/LTE communication interface has a strong signal.

Referring to FIG. 2, the application module 103 may request a host access (HTTP request) from the URL protocol handler 105 (Step 1). The URL protocol handler 105 may perform a DNS resolution corresponding to IPv4 for the HTTP request through the previously set Wi-Fi communication interface 109 and the DNS handler 107 from the DNS server 121, and may access the web server 131 through the Wi-Fi communication interface 109 based on an IP address of a host obtained through the DNS resolution (Steps 2, 3, and 4). When host's HTTP request is received for the second time in the state in which the 3G/LTE communication interface 111 is activated, the URL protocol handler 105 may perform a DNS resolution corresponding to IPv4 through the Wi-Fi communication interface 109, thereby obtaining the IP address of the host (Steps 5 and 6).

Subsequently, the URL protocol handler 105 may transmit an HTTP request to the web server 131 through the 3G/LTE communication interface 111 based on the obtained IP address (Step 7).

However, in Steps 3 and 6, even through the 3G/LTE communication interface 111 has a high transmission speed (e.g., 0.5 [sec]), a DNS resolution (a transmission of a DNS query requesting an IP address of a host and a reception of a DNS response thereto) is performed through the Wi-Fi communication interface 109 having a weak signal, and thus, a large amount of time (e.g., 10 [sec]) may be expended for the DNS resolution.

Figure 3:
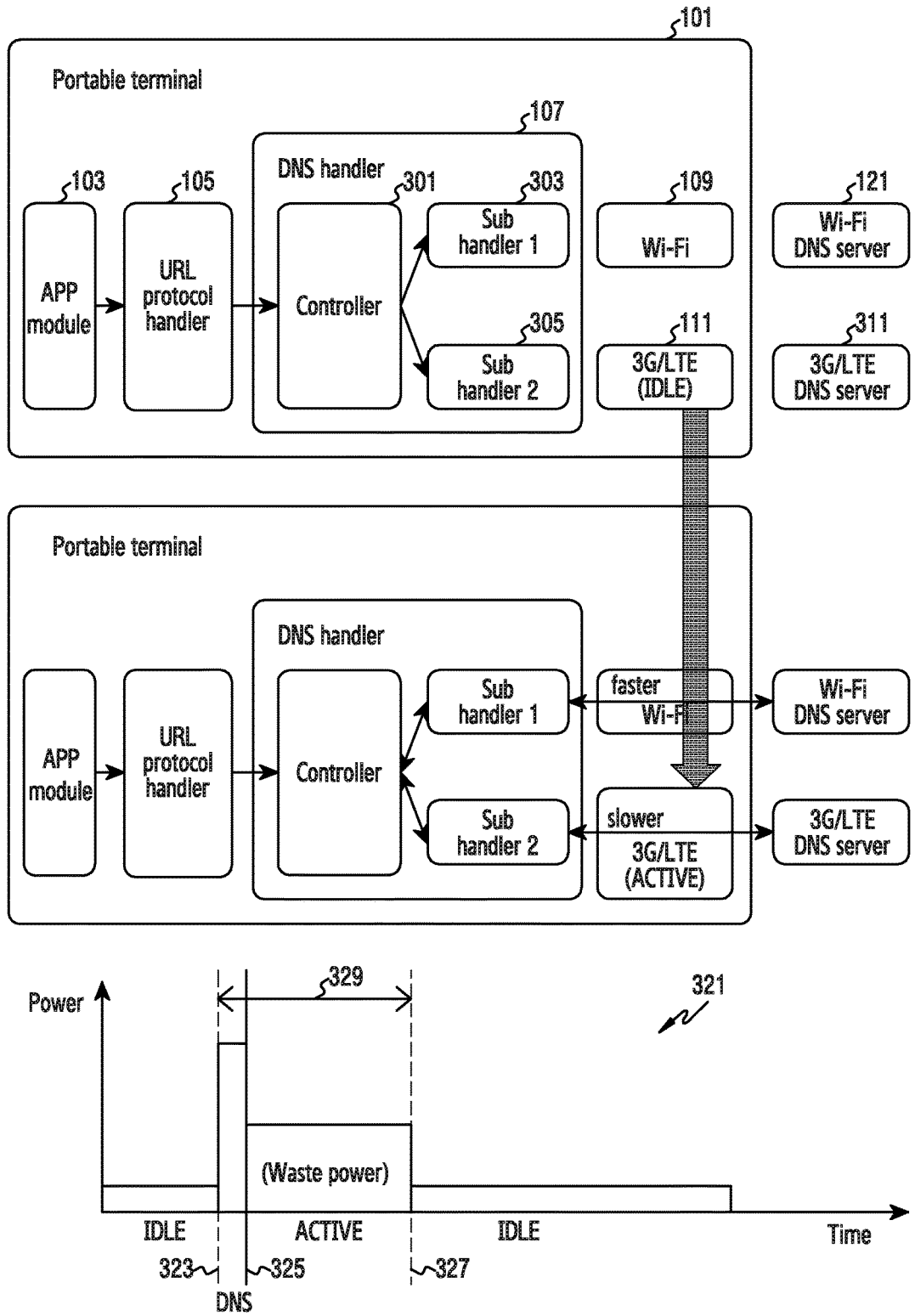
FIG. 3 is a diagram illustrating a DNS resolution operation performed through communication interfaces that support Wi-Fi and 3G/LTE in a portable terminal according to a related art of the present disclosure.

FIG. 3 is a diagram illustrating a DNS resolution operation performed through communication interfaces that support Wi-Fi and 3G/LTE in a portable terminal according to a related art of the present disclosure.

Referring to FIG. 3, the portable terminal 101 may include the application module 103, the URL protocol handler 105, the DNS handler 107, the Wi-Fi communication interface 109, and the 3G/LTE communication interface 111. The DNS handler 107 may include a controller 301, a sub-handler 1 303, and a sub-handler 2 305.

Each element will be described. The sub-handler 1 303 is connected with the Wi-Fi communication interface 109, and may transmit a DNS query to a Wi-Fi DNS server 121 through the Wi-Fi communication interface 109 when receiving the DNS query. The sub-handler 1 303 may receive a DNS response through the Wi-Fi communication interface 109 from the Wi-Fi DNS server 121, in response to the DNS query. Here, the DNS response may include an IP address of a corresponding host.

The sub-handler 2 305 may be connected with the 3G/LTE communication interface 111, and may transmit a DNS query to a 3G/LTE DNS server 311 through the 3G/LTE communication interface 111, when receiving the DNS query. The sub-handler 2 305 may receive a DNS response through the 3G/LTE communication interface 111 from the 3G/LTE DNS server 311, in response to the DNS query.

A controller 301 may control the sub-handler 1 303 and the sub-handler 2 305. The controller 301 may transmit a DNS query through at least one of the sub-handler 1 303 and the sub-handler 2 305, when receiving the DNS query from the URL protocol handler 105.

For example, the controller 301 may transmit a DNS query to both the Wi-Fi communication interface 109 and the 3G/LTE communication interface 111 through the sub-handler 1 303 and the sub-handler 2 305. For example, when the transmission speed of the Wi-Fi communication interface 109 is faster than the 3G/LTE communication interface 111, the Wi-Fi communication interface 109 and the 3G/LTE communication interface 111 switch an idle state into an active state at point 1 323, as shown in a graph 321, and transmits a DNS query. The Wi-Fi communication interface 109 may receive a DNS response at point 2 325, and may switch an active state to an idle state. The 3G/LTE communication interface 111 may receive a DNS response at point 3 327, and may switch an active state to an idle state.

However, the 3G/LTE communication interface 111 maintains a predetermined period of time 329 (from point 2 325 to point 3 327) after receiving a DNS response through the Wi-Fi communication interface 109, thereby wasting power.

Figure 4A:
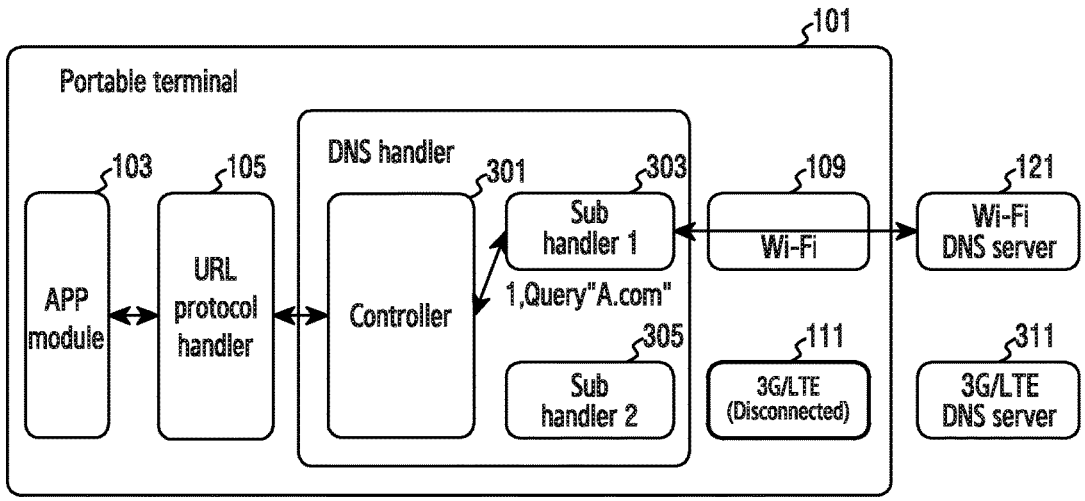
FIG. 4 is a diagram illustrating a DNS resolution operation performed by a portable terminal having communication interfaces that support Wi-Fi and 3G/LTE according to a related art of the present disclosure.
Figure 4B:
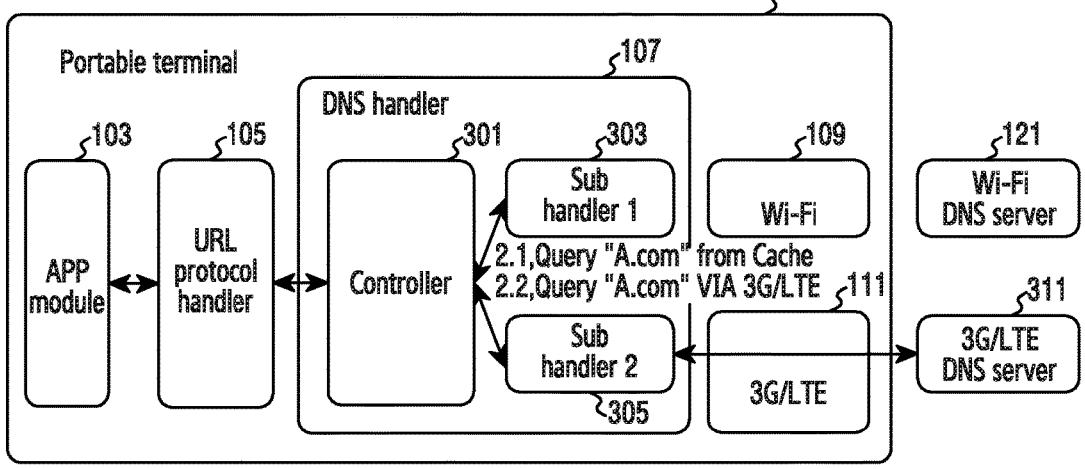
Figure 4C:
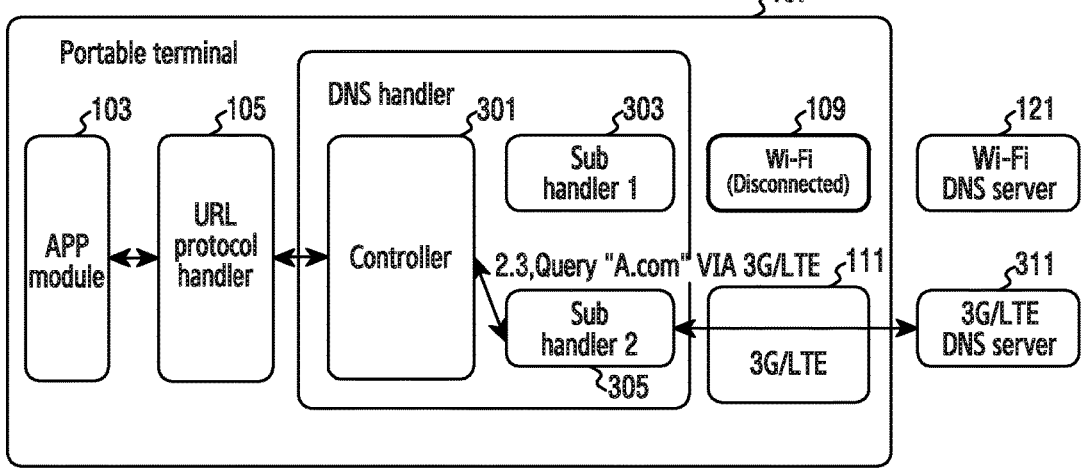

FIG. 4 is a diagram illustrating a DNS resolution operation performed by a portable terminal having communication interfaces that support Wi-Fi and 3G/LTE according to a related art of the present disclosure. FIG. 4 assumes that a DNS query is transmitted to one of the Wi-Fi communication interface 109 and the 3G/LTE communication interface 111.

As illustrated in the diagram (a) of FIG. 4, the controller 301 transmits a DNS query associated with "A.COM" to the Wi-Fi DNS server 121 through the sub-handler 1 303 and the Wi-Fi communication interface 109, and receives a DNS response from the Wi-Fi DNS server 121 through the Wi-Fi communication interface 109. In this instance, the 3G/LTE communication interface 111 may be in a deactivated state (idle state). Subsequently, as illustrated in the diagrams (b) and (c) of FIG. 4, the controller 301 may transmit a DNS query associated with "A.COM" to the 3G/LTE DNS server 311 through the sub-handler 2 305 and the 3G/LTE communication interface 111, and may receive a DNS response from the 3G/LTE DNS server 311 through the 3G/LTE communication interface 111. After this, the controller 301 may perform a DNS resolution through the 3G/LTE communication interface 111.

However, the DNS resolution associated with "A.COM" is performed again through the 3G/LTE communication interface 111 after the DNS resolution associated with "A.COM" is performed through the WiFi communication interface 109. Therefore, power may be unnecessarily consumed due to the unnecessary operation of the 3G/LTE communication interface 111. Also, a DNS response is received again through the 3G/LTE communication interface 111, and thus, a time for the DNS resolution may be delayed.

Figure 5:
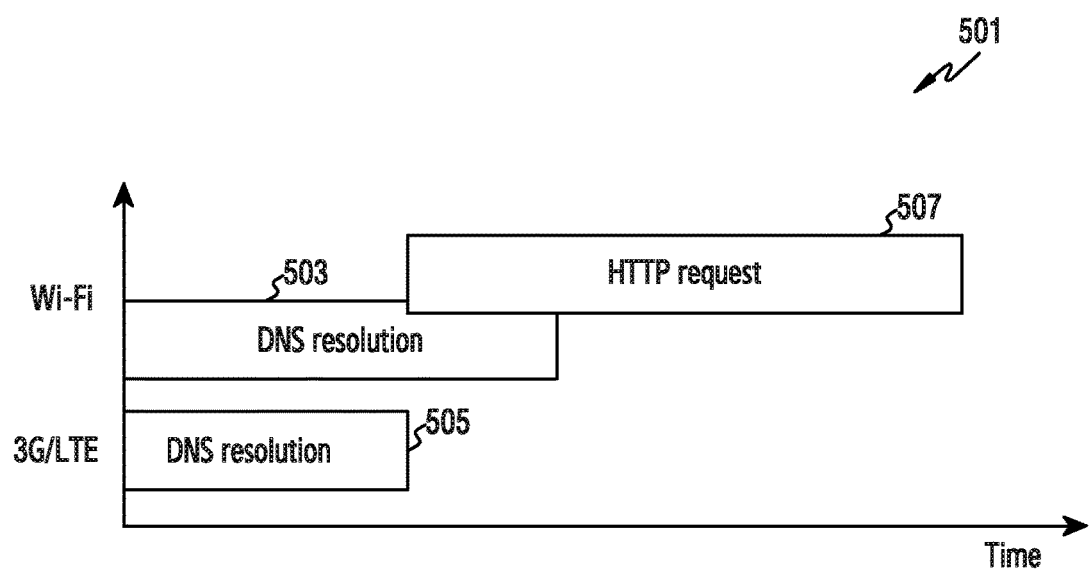
FIG. 5 is a graph illustrating DNS resolution times corresponding to communication interfaces that support Wi-Fi and 3G/LTE in a portable terminal according to a related art of the present disclosure.

FIG. 5 is a graph illustrating DNS resolution times corresponding to communication interfaces that support Wi-Fi and 3G/LTE in a portable terminal according to a related art of the present disclosure.

According to a graph 501 of FIG. 5, the transmission speed of the 3G/LTE communication interface 111 is faster than that of the Wi-Fi communication interface 109, and thus, an operation time 505 of a DNS resolution through the 3G/LTE communication interface 111 may be shorter than an operation time 503 of a DNS resolution through the Wi-Fi communication interface 109. Subsequently, when an HTTP request 507 is executed through the 3G/LTE communication interface 111, the URL protocol handler 105 may receive a quick response to the HTTP request.

However, although a DNS resolution has been completed through the 3G/LTE communication interface 111, the URL protocol handler 105 may not receive a quick response to the HTTP request when an HTTP request is executed through the Wi-Fi communication interface 109.

Figure 6:
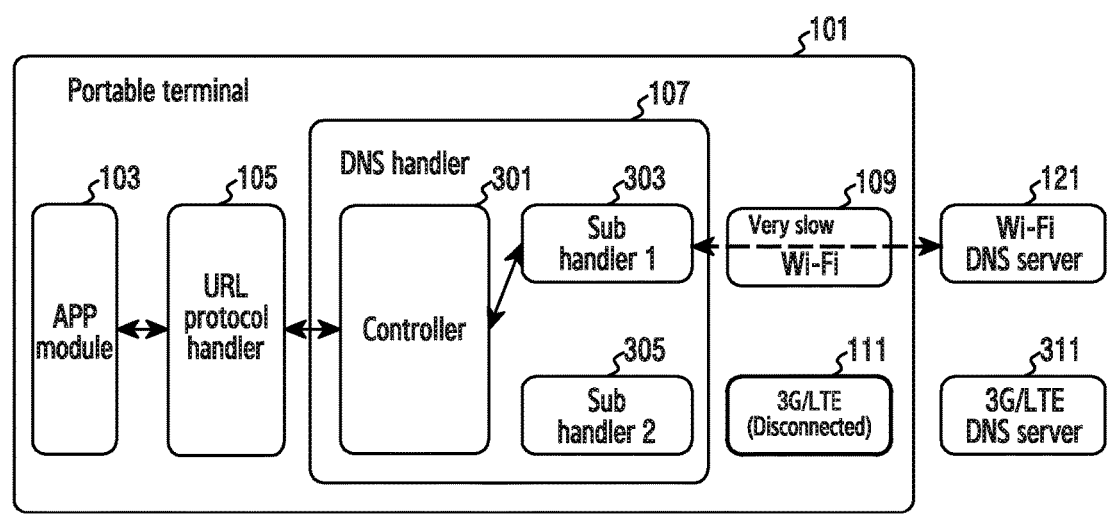
FIG. 6 is a diagram illustrating a DNS resolution operation performed through communication interfaces that support Wi-Fi and 3G/LTE in a portable terminal according to a related art of the present disclosure.

FIG. 6 is a diagram illustrating a DNS resolution operation performed through communication interfaces that support Wi-Fi and 3G/LTE in a portable terminal according to a related art of the present disclosure.

Referring to FIG. 6, generally, a DNS resolution mechanism using a multi-radio access technology (multi-RAT) may be applied from a second URL request (HTTP request). Therefore, a DNS resolution by a first URL request may be executed through a previously set communication interface among a plurality of communication interfaces.

However, when the previously set communication interface is the Wi-Fi communication interface 109 having a lower transmission speed than that of the 3G/LTE communication interface 111, a portable terminal may not efficiently execute a DNS resolution.

Figure 7:
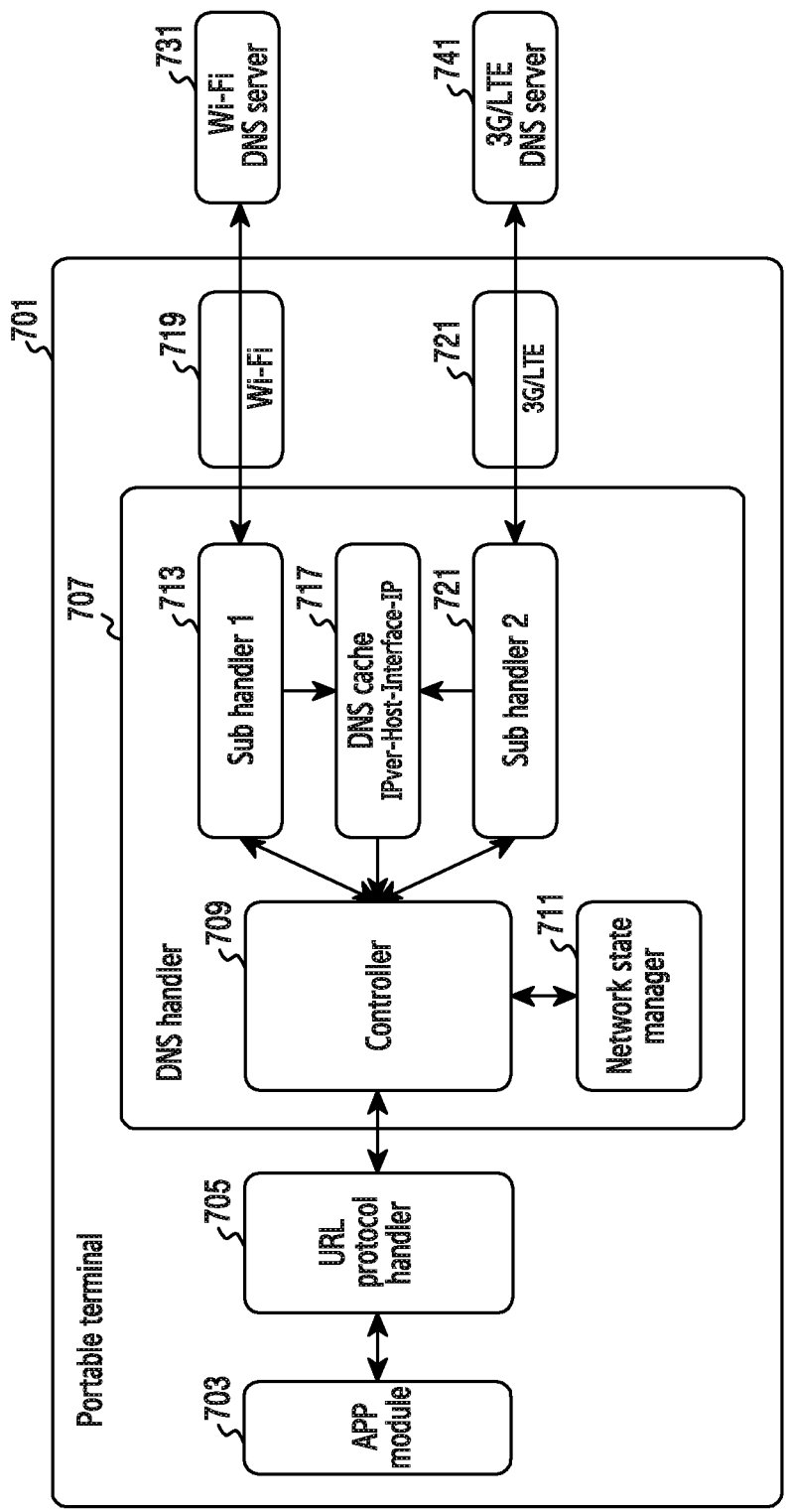
FIG. 7 is a block diagram of a portable terminal according to an embodiment of the present disclosure.

FIG. 7 is a block diagram of a portable terminal according to an embodiment of the present disclosure.

Referring to FIG. 7, a portable terminal 701 may include an application module 703, a URL protocol handler 705, a DNS handler 707, a Wi-Fi communication interface 719, and a 3G/LTE communication interface 721. The DNS handler 707 may include a controller 709, a network state manager 711, a sub-handler 1 713, a sub-handler 2 715, and a DNS cache 717. For example, the controller 709 may be referred to as a controller.

Each element will be described. The network state manager 711 may detect a connection state of the Wi-Fi communication interface 719 and a connection state of the 3G/LTE communication interface 721, and may store history information associated with a DNS resolution time of each communication interface.

The DNS cache 717 may match a host name and an IP address to an IP version and an ID of a communication interface that receives the corresponding IP address, and may store the same. When host information (e.g., host name) is received from the controller 709, the sub-handler 1 713, or the sub-handler 2 715, the DNS cache 717 may search for an IP address corresponding to the received host information from among stored host IP addresses, and transmit the retrieved IP address to the controller 709. For example, the DNS cache 717 may transmit the retrieved IP address and information associated with the corresponding communication interface (e.g., the ID and IP version of a communication interface).

The controller 709 may receive a DNS query from the URL protocol handler 705, and may transmit the IP address of a host associated with the DNS query to the URL protocol handler 705 in response to the DNS query. The controller 709 may determine the DNS cache 717 and the network state manager 711, and may determine an operation to perform in association with the DNS query.

When an IP address that matches a host name associated with the DNS query or an IP address that matches the host name and an IP version is retrieved from the DNS cache 717, the controller 709 may transmit the retrieved IP address to the URL protocol handler 705.

Unlike the above, when an IP address that matches a host name and an IP version associated with the DNS query is not retrieved from the DNS cache 717, the controller 709 may transmit the DNS query according to a predetermined condition through a plurality of communication interfaces in parallel, or through a relatively faster communication interface from among the plurality of communication interfaces.

Here, the predetermined condition may include information indicating whether the transmission speeds of the plurality of communication interfaces are nearly the same, or information indicating which communication interface has a relatively faster transmission speed from the plurality of communication interfaces. The predetermined condition may be determined based on history information associated with a DNS resolution time stored in the network state manager 711.

The sub-handler 1 713 may be connected with the Wi-Fi communication interface 719, and the sub-handler 2 715 may be connected with the 3G/LTE communication interface 721. As described above, the DNS handler 707 may include a plurality of sub-handlers for a DNS resolution mechanism using a multi-RAT.

The Wi-Fi communication interface 719 may be wirelessly connected to a Wi-Fi DNS server 713, and the 3G/LTE communication interface 721 may be wirelessly connected to a 3G/LTE DNS server 741.

Figure 8:
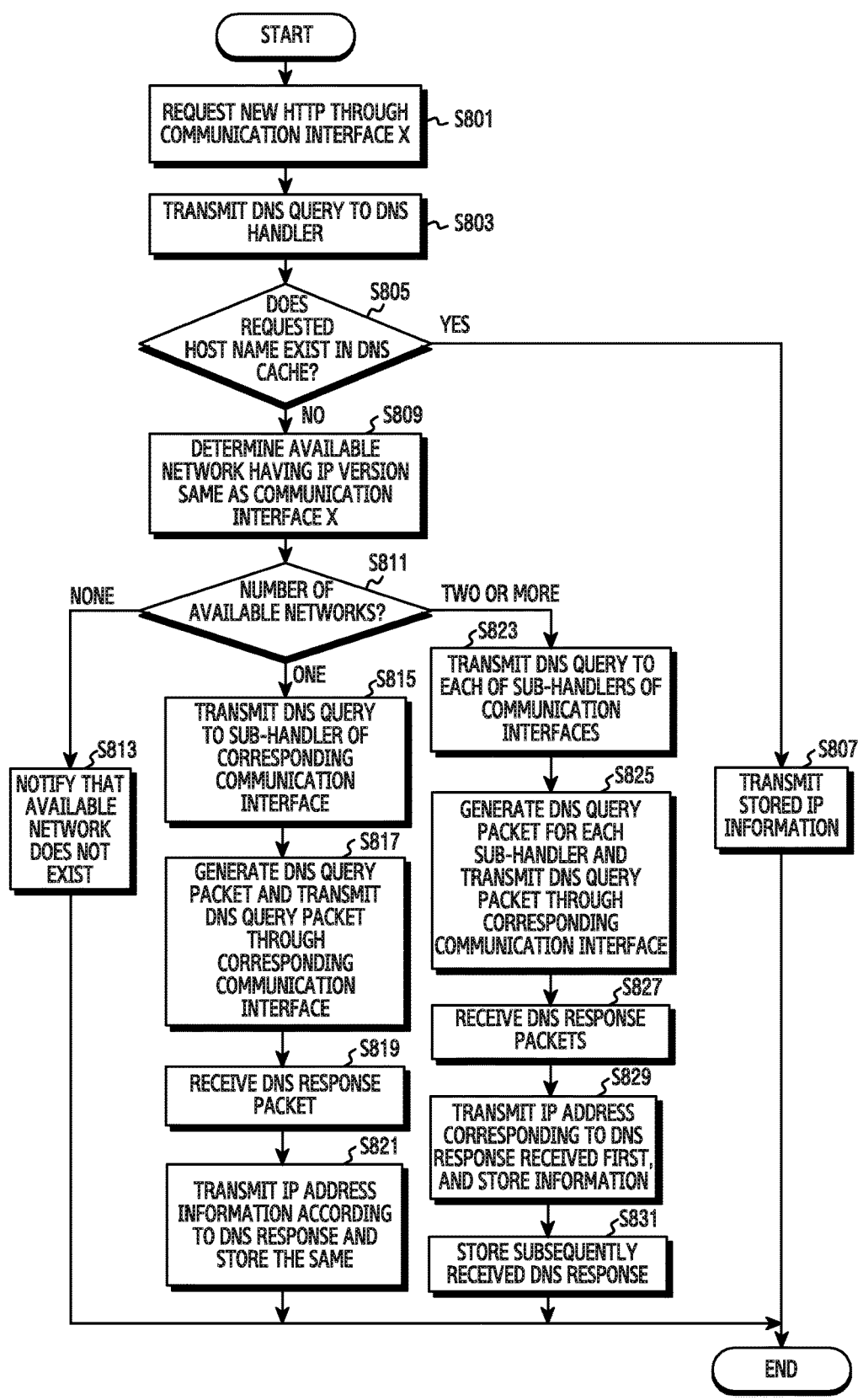
FIG. 8 is a flowchart illustrating DNS handling in a portable terminal according to a first embodiment of the present disclosure.

FIG. 8 is a flowchart illustrating DNS handling in a portable terminal according to a first embodiment of the present disclosure. Referring to FIG. 8, when a new HTTP request is received through communication interface X, the application module 703 transmits the received HTTP request to the URL protocol handler 705 in operation S801. In operation S803, the URL protocol handler 705 transmits a DNS query to the DNS handler 707.

In operation S805, the controller 709 of the DNS handler 707 determines whether the name of a host associated with a DNS query exists in the DNS cache 717. When the determination shows that an IP address exists in the DNS cache 717, the controller 709 proceeds with operation S807. Otherwise, the controller 709 proceeds with operation S809.

Figure 9:
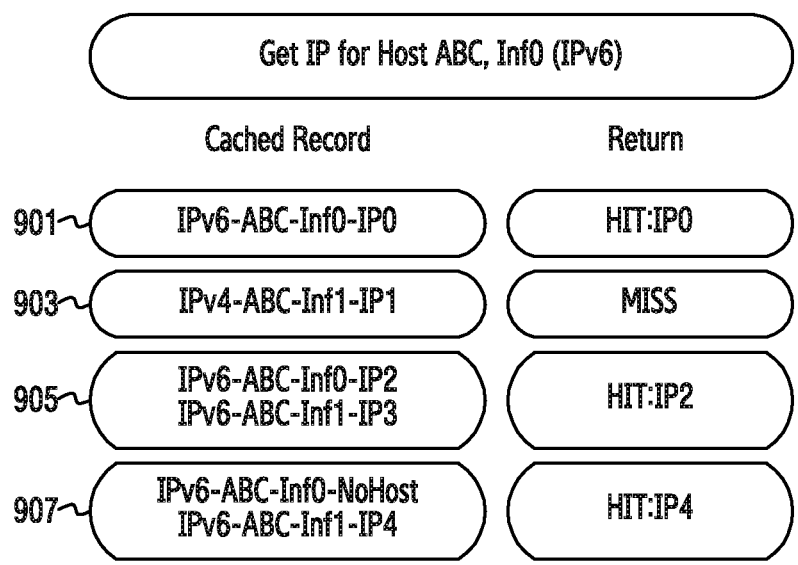
FIG. 9 is a diagram illustrating a format of information stored in a DNS cache according to an embodiment of the present disclosure.

For example, the DNS cache 717 may store the IP address of a predetermined host, as illustrated in FIG. 9. For example, an IP address may be stored together with the ID of a predetermined communication interface that receives a DNS response including the IP version of the communication interface X, a host name, and an IP address, as shown in the diagrams 901 to 907.

When the process proceeds with operation S807, the controller 709 may search for an IP address that matches the host name and the IP version of the communication interface X, from among IP addresses stored in the DNS cache 717, and may transmit the retrieved IP address to the URL protocol handler 705.

For example, when a plurality of IP addresses having different communication interface IDs are retrieved, the controller 709 may transmit, to the URL protocol handler 705, an IP address that matches the ID of a previously set communication interface from among the plurality of IP addresses. As another example, when one of the plurality of retrieved IP addresses is "NoHost" indicating that an IP address does not exist, the controller 709 may transmit another IP address to the URL protocol handler 705.

As another example, when an IP address that has the same host name but has a different IP version is retrieved from among the stored IP addresses, the controller 709 may determine that a cache miss has occurred and may proceed with operation S809. Here, the cache miss indicates that an IP address that has the same host name but has a different IP version exists, or indicates that an IP address having the same host name does not exist in the stored IP addresses stored in the DNS cache 717.

When the process proceeds with operation S809, the controller 709 may determine all communication interfaces having the same IP version as that of the communication interface X, from among the plurality of communication interfaces. Here, a communication interface having the same IP version as the communication interface X may be called an available communication interface, and the available communication interface indicates a communication interface that is connected to the IP address of a host. In operation S811, the controller 709 determines the number of available communication interfaces. When the determination shows that no available communication interface exists, the controller 709 proceeds with operation S813. When the number of available communication interfaces is 1, the controller 709 proceeds with operation S815. When the number of available communication interfaces is 2 or more, the controller 709 proceeds with operation S823.

When the process proceeds with operation S813, the controller 709 transmits information indicating that an available communication interface does not exist to the URL protocol handler 705.

When the process proceeds with operation S815, the controller 709 transmits a DNS query to a sub-handler (e.g., the sub-handler 1 713 and the sub-handler 2 715) connected to a corresponding communication interface (e.g., one of the Wi-Fi communication interface 719 and the 3G/LTE communication interface 721). In operation S817, the sub-handler generates a DNS query packet, and transmits the DNS query packet to a DNS server (one of the Wi-Fi DNS server 731 and the 3G/LTE DNS server 741) through the corresponding communication interface. In operation S819, the sub-handler receives a DNS response packet from the DNS server, and transmits the same to the controller 709. For example, the DNS response packet may include the IP address of a host.

In operation S821, the controller 709 transmits the IP address according to the DNS response to the URL protocol handler 705, and stores the same in the DNS cache 717. In this instance, the controller 709 may transmit the IP address and an ID of a communication interface that receives the DNS response. For example, the controller 709 may store the IP address in the format as shown in FIG. 9.

When the process proceeds with operation S823, the controller 709 transmits a DNS query to each of sub-handlers (e.g., the sub-handler 1 713 and the sub-handler 2 715) connected to available communication interfaces (e.g., the Wi-Fi communication interface 719 and the 3G/LTE communication interface 721). In operation S825, each sub-handler generates a DNS query packet, and transmits the DNS query packet to a DNS server (one of the Wi-Fi DNS server 731 and the 3G/LTE DNS server 741) through a corresponding communication interface.

Figure 10A:
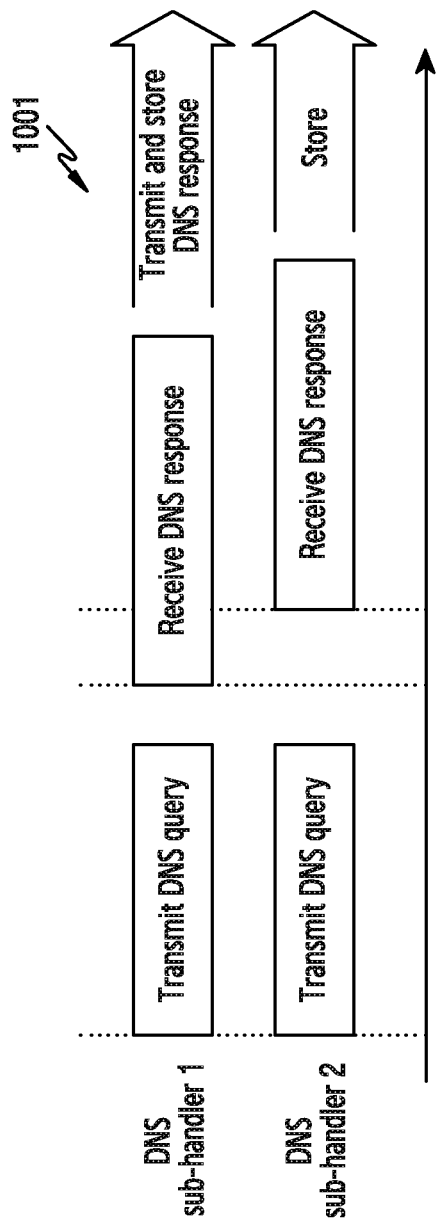
FIG. 10 is a graph illustrating a return transmission of a DNS response for each sub handler according to an embodiment of the present disclosure.
Figure 10B:
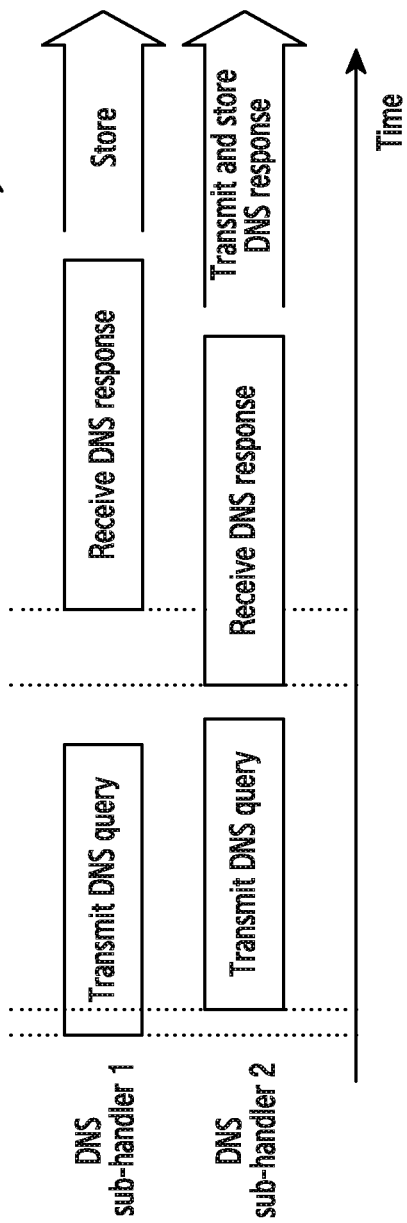

For example, as shown in a graph 1001 of FIG. 10, a DNS query may be transmitted through a plurality of available communication interfaces in parallel. As another example, as shown in a graph 1003 of FIG. 10, a DNS query may be transmitted sequentially through a plurality of available communication interfaces. For example, when a communication interface through which a DNS query is preferentially transmitted may be set by taking into consideration a DNS resolution time, a low power consumption, and the like.

In operation S827, the sub-handler receives DNS response packets sequentially from the DNS servers, and transmits the same to the controller 709. In operation S829, the controller 709 transmits, to the URL protocol handler 705, an IP address according to a DNS response that is received first, and stores the same in the DNS cache 717. In this instance, the controller 709 may transmit the IP address and an ID of a communication interface that receives the DNS response. In operation S831, the controller 709 stores an IP address according to a subsequently received DNS response in the DNS cache 717.

Figure 11:
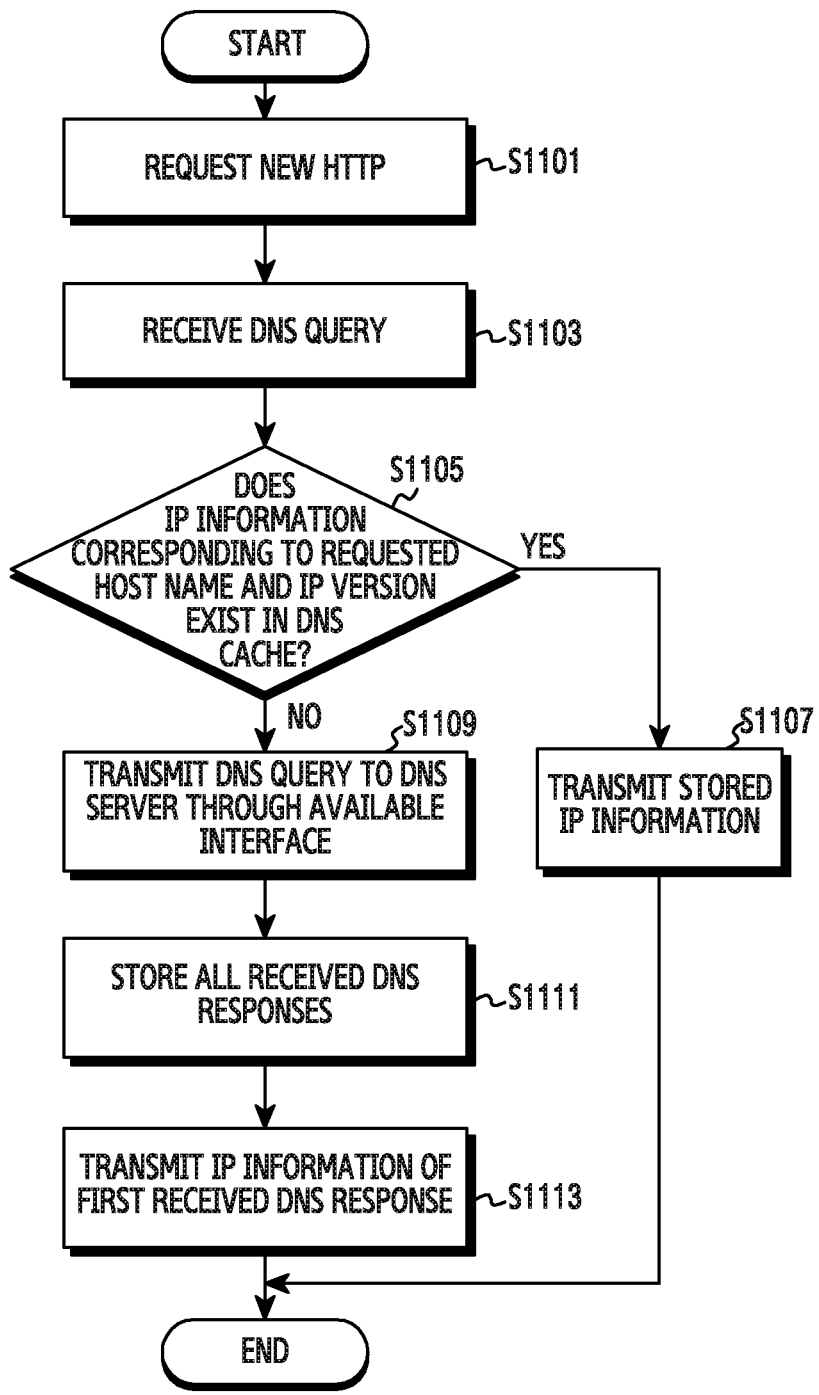
FIG. 11 is a flowchart illustrating DNS handling performed in a portable terminal according to a second embodiment of the present disclosure.

FIG. 11 is a flowchart illustrating DNS handling performed in a portable terminal according to a second embodiment of the present disclosure. Referring to FIG. 11, in operation S1101, the URL protocol handler 705 receives a new HTTP request associated with a host from the application module 703, and transmits a DNS query to the DNS handler 707. In operation S1103, the controller 709 of the DNS handler 707 receives the DNS query, and determines a host name and the IP version of communication interface X associated with the HTTP request.

In operation S1105, the controller 709 determines whether an IP address that corresponding to the determined host name and the IP version exists in the DNS cache. When the determination shows that the IP address exists, the controller 709 may proceed with operation S1107. Otherwise, the controller 709 proceeds with operation S1109.

When the process proceeds with operation S1107, the controller 709 searches for IP address information (e.g., IP address) corresponding to the determined host name and the IP version from among IP addresses stored in the DNS cache 717, and transmits the retrieved information to the URL protocol handler 705. When the process proceeds with operation S1109, the controller 709 transmits the DNS query to a DNS server through all available communication interfaces. In operation S1111, the controller 709 receives a DNS response from the DNS server in response to the DNS query, and stores the received DNS response in the DNS cache 717. In operation S1113, the controller 709 transmits, to the URL protocol handler 705, an IP address corresponding to a DNS response received first. As another example, the controller 709 performs operations by changing the sequence of operations S1111 and S1113. For example, the controller 709 transmits, to the URL protocol handler 705, an IP address corresponding to a DNS response received first, and stores the same in the DNS cache 717. The controller 709 may store an IP address corresponding to a subsequently received DNS response in the DNS cache 717, without transmitting the same.

Figure 12A:
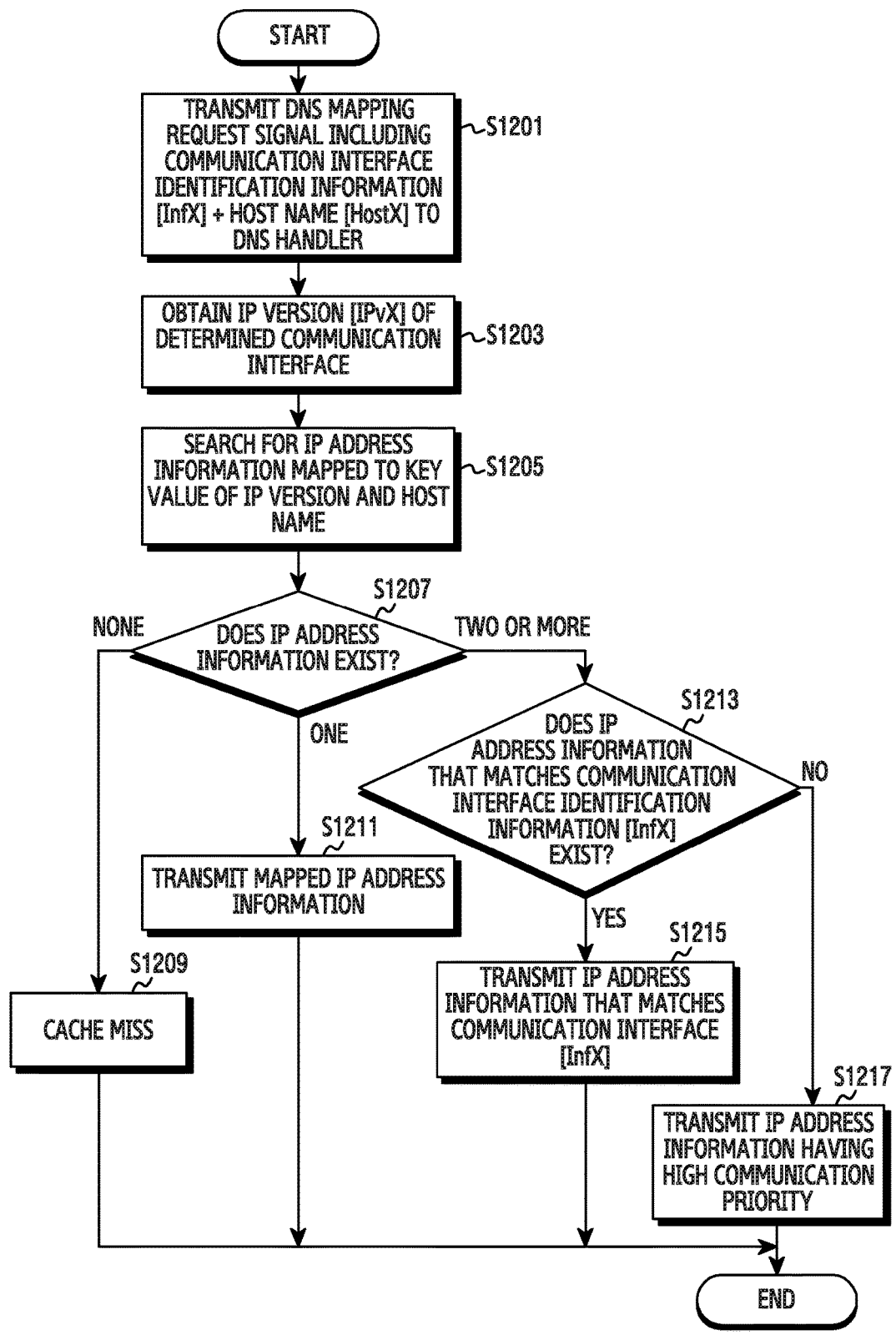
FIG. 12A and FIG. 12B are flowcharts illustrating a process in which a portable terminal maps IP address information stored in a DNS cache according to an embodiment of the present disclosure.
Figure 12B:
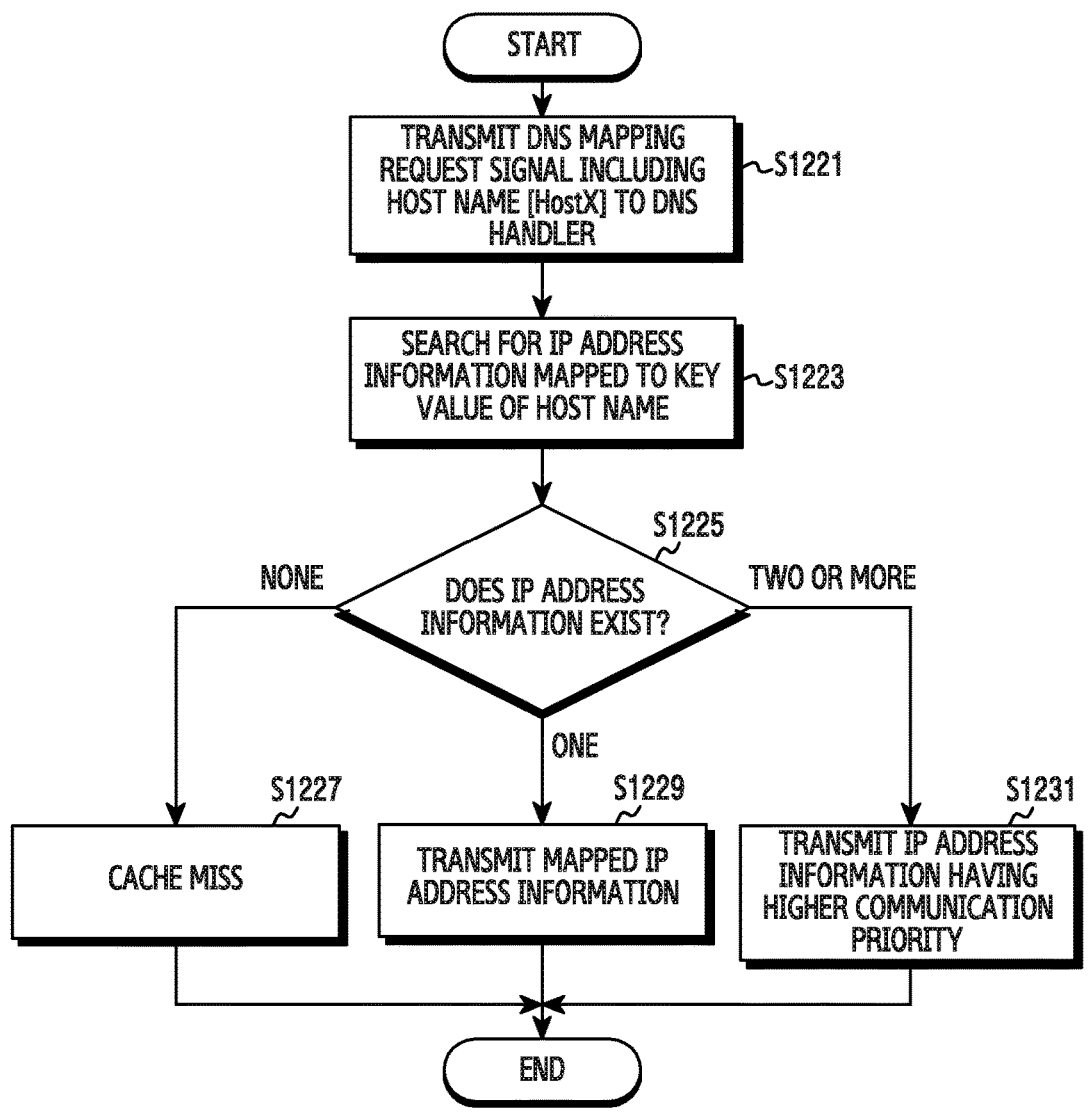

FIGS. 12A and 12B are flowcharts illustrating a process in which a portable terminal maps IP address information stored in a DNS cache according to an embodiment of the present disclosure.

FIG. 12A assumes that a communication interface that is to perform a DNS resolution is determined. Referring to FIG. 12A, the URL protocol handler 705 transmits a DNS query associated with a determined communication interface to the DNS handler 707 in operation S1201. In this instance, the URL protocol handler 705 transmits a DNS mapping request together with a URL query signal, to the DNS handler 707. For example, the DNS mapping request may include identification information (e.g., InfX) of a communication interface and a host name (e.g., Host X).

In operation S1203, the controller 709 of the DNS handler 707 obtains the IP version (e.g., IPvX) of the communication interface from identification information (e.g., InfX) of the communication interface. In operation S1205, the controller 709 searches the DNS cache 717 for IP address information that is mapped to the host name (e.g., Host X) and the IP version (e.g., IPvX).

In operation S1207, the controller 709 determines the number of pieces of mapped IP address information. When the mapped IP address information does not exist, the controller 709 proceeds with operation S1209. When the number of pieces of mapped IP address information is 1, the controller 709 proceeds with operation S1211. When the number of pieces of mapped IP address information is 2 or more, the controller proceeds with operation S1213.

When the process proceeds with operation S1209, the controller 709 determines that a cache miss occurs. When the process proceeds with operation S1211, the controller 709 transmits the mapped IP address information to the URL protocol handler 705.

When the process proceeds with operation S1213, the controller 709 determines whether IP address information that matches the identification information (e.g., InfX) of the communication interface, exists among the mapped IP address information. When the determination shows that the matching IP address exists, the controller 709 may proceed with operation S1215. Otherwise, the controller 709 proceeds with operation S1217.

When the process proceeds with operation S1215, the controller 709 transmits the IP address information that matches the identification information (e.g., InfX) of the communication interface, to the URL protocol handler 705. When the process proceeds with operation S1217, the controller 709 may transmit, to the URL protocol handler 705, IP address information having a higher communication priority from among the two or more pieces of mapped IP address information. Here, the communication priority may be set in advance by taking into consideration a degree of power consumption, a transmission speed, or the like. For example, the Wi-Fi communication interface 719 may be set to be a first priority, and the 3G/LTE communication interface 721 may be set to be a second priority.

FIG. 12B assumes that a communication interface that is to perform a DNS resolution is not determined. Referring to FIG. 12B, the URL protocol handler 705 transmits a URL query associated with a communication interface, which has not been determined, to the DNS handler 707 in operation S1221. In this instance, the URL protocol handler 705 transmits a DNS mapping request together with the URL query, to the DNS handler 707. For example, the DNS mapping request may include only a host name (e.g., Host X). In operation S1223, the controller 709 of the DNS handler 707 searches the DNS cache 717 for IP address information that is mapped to a host name (e.g., Host X).

In operation S1225, the controller 709 determines the number of pieces of mapped IP address information. When the determination shows that the IP address information does not exist, the controller 709 proceeds with operation S1227. When the number of pieces of the IP address information is 1, the process proceeds with operation S1229. When the number of pieces of IP address information is two or more, the process proceeds with operation S1231.

When the process proceeds with operation S1227, the controller 709 determines that a cache miss occurs. When the process proceeds with operation S1229, the controller 709 transmits the mapped IP address information to the URL protocol handler 705. When the process proceeds with operation S1231, the controller 709 may transmit, to the URL protocol handler 705, IP address information having a higher communication priority from among the two or more pieces of mapped IP address information.

Figure 13:
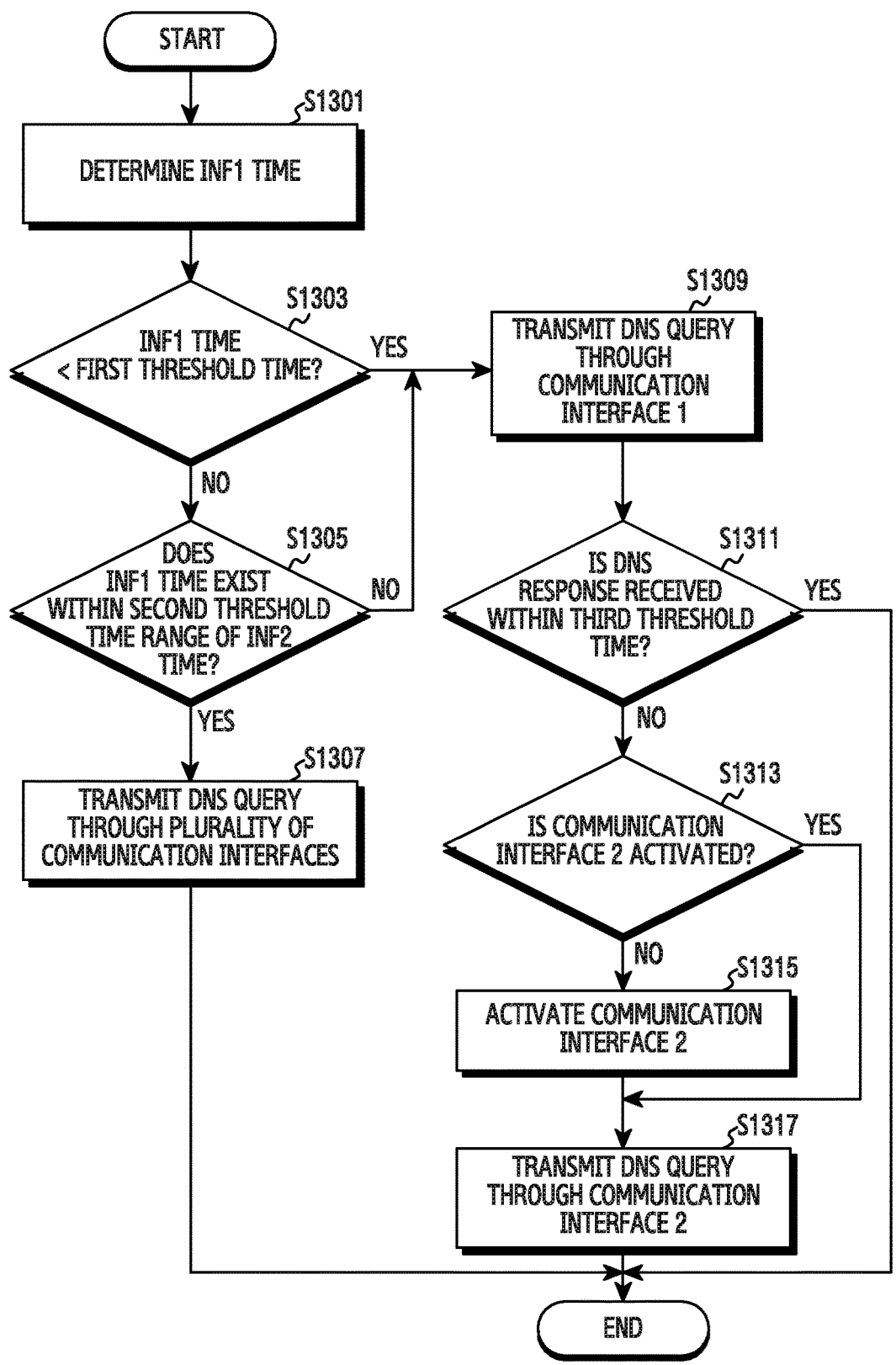
FIG. 13 is a flowchart illustrating a process in which a portable terminal transmits a DNS query according to an embodiment of the present disclosure.

FIG. 13 is a flowchart illustrating a process in which a portable terminal transmits a DNS query according to an embodiment of the present disclosure. It is assumed that communication interface Inf1 is a communication interface that is set in advance for the reduction of power.

Referring to FIG. 13, in operation 1301, the controller 709 determines a previous DNS resolution time (a first DNS resolution time (Inf1 Time)) of communication interface 1 (e.g., the Wi-Fi communication interface 719) based on history information of a DNS resolution time of each communication interface, which is stored in the network state manager 711. In operation 1303, the controller 709 determines whether a first DNS resolution time of the communication interface 1 is less than a first threshold time (e.g., a minimum time value of a DNS resolution). When the determination shows that the first DNS resolution time is less than the first threshold time, the controller 709 proceeds with operation S1309. Otherwise, the controller 709 proceeds with operation S1305.

When the process proceeds with operation S1305, the controller 709 determines whether the first DNS resolution time of the communication interface 1 is within a second threshold time range based on a previous DNS resolution time (a second DNS resolution time (Inf2 Time)) of communication interface 2 (e.g., 3G/LTE communication interface 721). Here, the second threshold time is a predetermined value. When the determination shows that the first DNS resolution time is within the second threshold time range of the second DNS resolution time, the controller 709 proceeds with operation S1307. Otherwise, the controller 709 proceeds with operation S1309.

When the process proceeds with operation S1307, the controller 709 determines that the transmission speeds of the communication interface 1 and the communication interface 2 are nearly the same, and transmits a DNS query to a DNS server through the communication interfaces 1 and 2. For example, as illustrated in the diagram (a) of FIG. 14, when a first DNS resolution time 1401 of the communication interface 1 is within a second threshold time range based on a second DNS resolution time of communication interface 2, the controller 709 transmits a DNS query to DNS servers through the communication interfaces 1 and 2 (e.g., the Wi-Fi communication interface 719 and the 3G/LTE communication interface 721) in parallel at a point 1501, as shown in the diagram (a) of FIG. 15.

When the process proceeds with operation S1309, the controller 1309 determines that the transmission speed of the communication interface 1 is faster than that of the communication interface 2, and transmits a DNS query through the communication interface 1. For example, as illustrated in the diagram (b) or the diagram (c) of FIG. 14, when a first DNS resolution time 1403 is less than a first threshold time or when a first DNS resolution time 1405 is out of a second threshold time range of a second DNS resolution time, the controller 709 may transmit a DNS query to a DNS server through the communication interface 1 (e.g., the Wi-Fi communication interface 719) at a point 1503, as shown in the diagram (c) of FIG. 15.

In operation S1311, the controller 709 determines whether a DNS response to the transmitted DNS query is received within a third threshold time. Here, the third threshold time may be a predetermined value or an average DNS resolution time of DNS resolution times associated with communication interfaces. When the determination shows that the DNS response is received within the third threshold time, the controller 709 terminates a DNS query transmission procedure. Unlike the above, when the DNS response is not received within the third threshold time, the controller 709 may proceed with operation S1313.

In operation S1313, the controller 709 determines whether the communication interface 2 is activated. When the determination shows that the communication interface 2 is activated, the controller 709 proceeds with operation S1317. Otherwise, the controller 709 proceeds with operation S1315. When the controller 709 proceeds with operation S1315, the controller 709 may activate the communication interface 2. For example, the controller 709 may convert the state of the communication interface 2 from an idle state to an active state.

In operation S1317, the controller 709 transmits a DNS query to a DNS server through the activated communication interface 2. For example, as illustrated in the diagram (c) of FIG. 15, when the third threshold time elapses from the point 1503, the controller 709 may transmit a DNS query through the communication interface 2 at a point 1505.

Figure 14A:
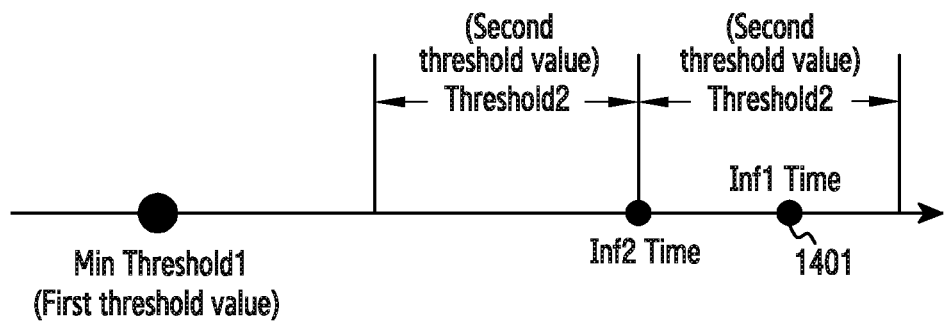
FIG. 14 is a graph illustrating a relationship between threshold values and previous DNS resolution times according to an embodiment of the present disclosure.
Figure 14B:
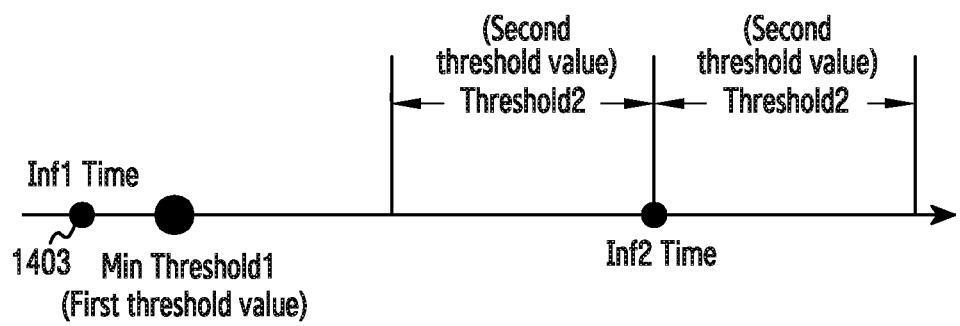
Figure 14C:
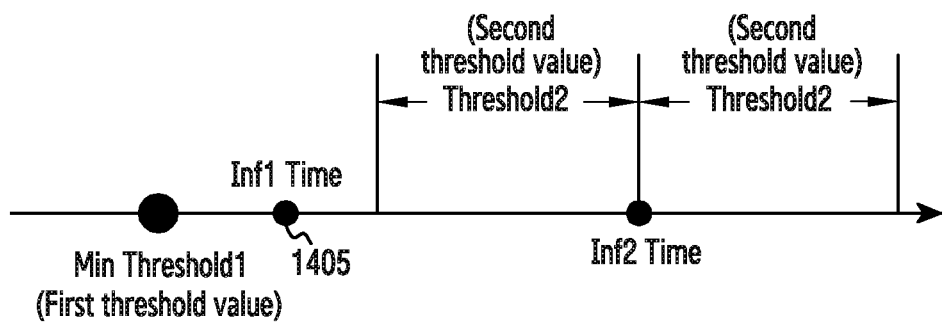
Figure 15A:
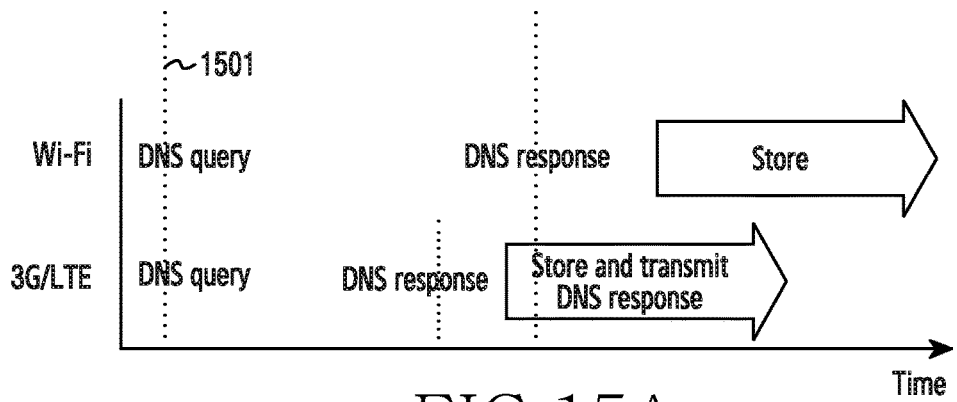
FIG. 15 is a graph illustrating a DNS response in response to a DNS query corresponding to the relationship of FIG. 14 according to an embodiment of the present disclosure.
Figure 15B:
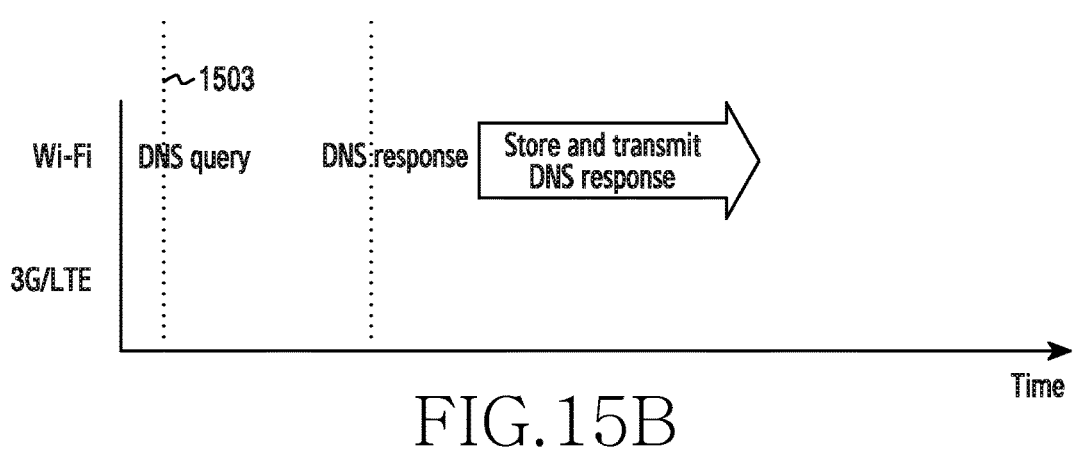
Figure 15C:
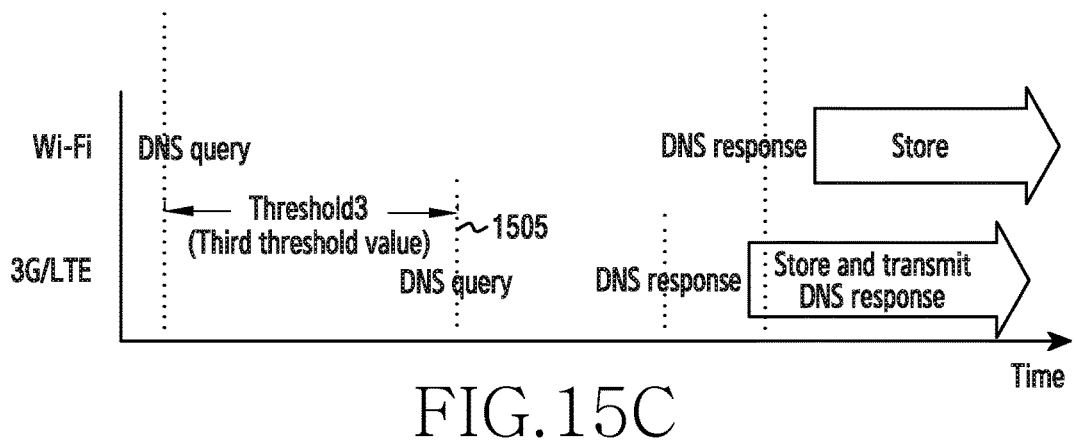

FIG. 14 is a graph illustrating a relationship between threshold values and previous DNS resolution times according to an embodiment of the present disclosure. FIG. 15 is a graph illustrating a DNS response in response to a DNS query corresponding to the relationship of FIG. 14 according to an embodiment of the present disclosure.

The diagram (a) of FIG. 14 is a graph illustrating the case in which a first DNS resolution time 1401 (Inf1 Time) of communication interface 1 is greater than a first threshold time (Min Threshold 1), and is within a second threshold time (Threshold 2) range of a second DNS resolution time (Inf2 Time) of communication interface 2. In this instance, as illustrated in the diagram (a) of FIG. 15, the controller 709 transmits a DNS query to DNS servers through all communication interfaces (Wi-Fi and 3G/LTE), receives DNS responses from the DNS servers, and stores (caches) the same in the DNS cache 717. In this instance, the controller 709 may transmit, to the URL protocol handler 705, IP address information corresponding to a DNS response received first.

The diagram (b) of FIG. 14 is a graph illustrating the case in which a first DNS resolution time 1403 of the communication interface 1 is less than a first threshold time. The diagram (c) of FIG. 14 is a graph illustrating the case in which a first DNS resolution time 1405 of the communication interface 1 is greater than a first threshold time, and is out of a second threshold time range of a second DNS resolution time of the communication interface 2. In the cases of the diagram (b) and the diagram (c) of FIG. 14, as illustrated in the diagram (b) of FIG. 15, the controller 709 transmits a DNS query to a DNS server through the communication interface 1 (e.g., the Wi-Fi communication interface 719), receives a DNS response from the DNS server through the communication interface 1, and stores the same. The controller 709 may transmit, to the URL protocol handler 705, IP address information corresponding to the received DNS response.

When the DNS response is not received from the DNS server during a third threshold time (Threshold 3) after the DNS query is transmitted to the DNS server in the diagram (b) of FIG. 15, the controller 709 transmits a DNS query to the DNS server through the communication interface 2 (e.g., the 3G/LTE communication interface 721) as opposed to the communication interface 1, receives a DNS response from the DNS response, and stores (caches) the same, as illustrated in the diagram (c) of FIG. 15. The controller 709 may transmit, to the URL protocol handler 705, IP address information corresponding to the received DNS response.

For example, information associated with the DNS response (e.g., the DNS resolution time of the communication interface 1 or 2) may be stored in the DNS cache 717 or the network state manager 711. The information associated with the DNS response may be used as information for determining a network state associated with a subsequent DNS query transmission.

When the controller 709 transmits the IP address information corresponding to the received DNS response to the URL protocol handler 705 through a plurality of communication interfaces (Wi-Fi and 3G/LTE communication interfaces 719 and 721), the controller 709 may transmit, to the URL protocol handler 705, communication interface identification information for identifying each communication interface together with the IP address information.

Figure 16:
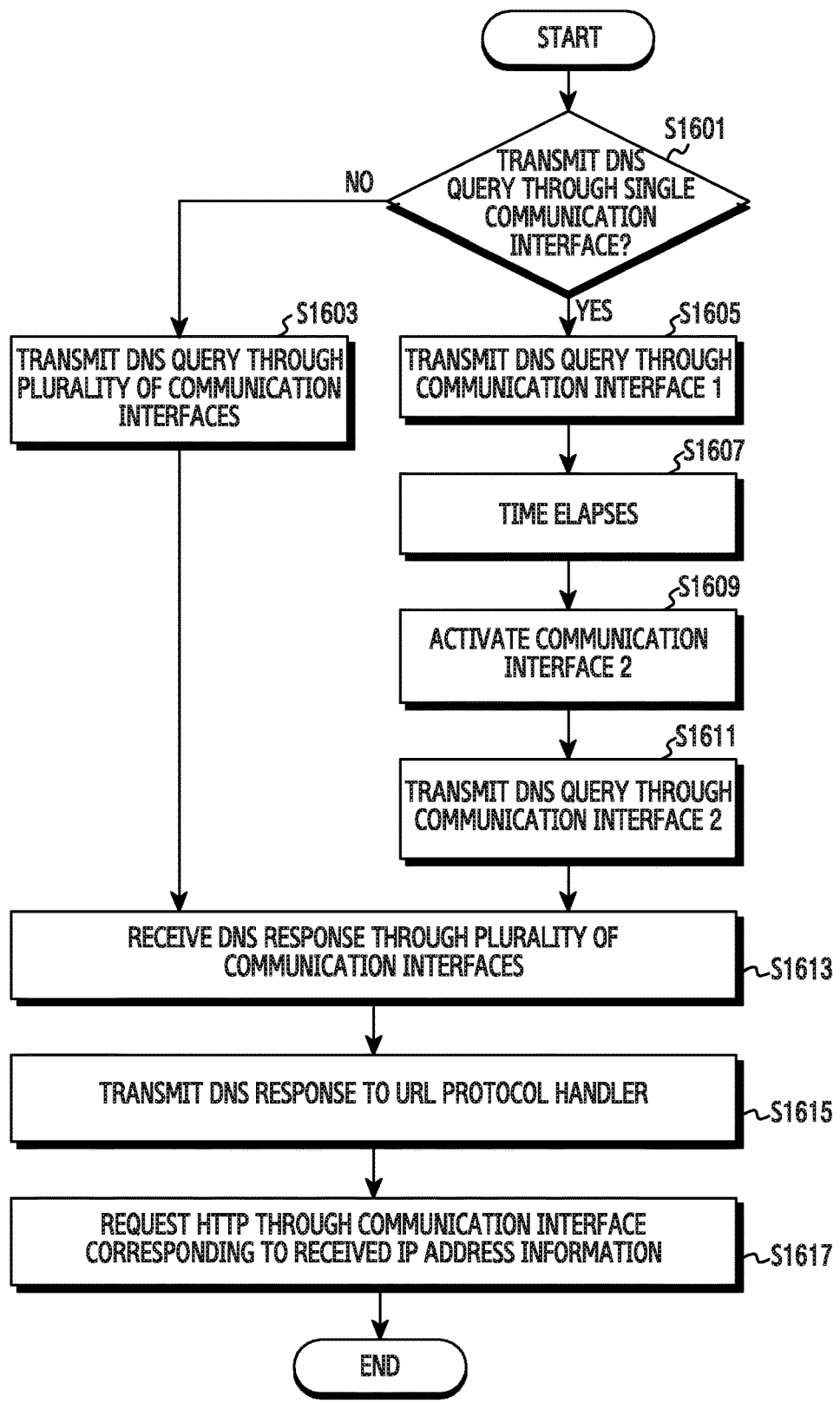
FIG. 16 is a flowchart illustrating a process in which a portable terminal requests HTTP according to a DNS response according to an embodiment of the present disclosure.

FIG. 16 is a flowchart illustrating a process in which a portable terminal requests HTTP according to a DNS response according to an embodiment of the present disclosure.

Referring to FIG. 16, in operation S1601, the DNS handler 707 determines whether a DNS query is transmitted through a single communication interface. For example, the DNS handler 707 determines a communication interface through which a DNS query is to be transmitted, based on a DNS resolution time of each communication interface.

When the determination shows that the DNS query is transmitted through a single communication interface, the DNS handler 707 proceeds with operation S1603. Otherwise, the DNS handler 707 proceeds with operation S1605.

When the process proceeds with operation S1603, the DNS handler 707 transmits a DNS query through a plurality of communication interfaces in parallel. When the process proceeds with operation S1605, the DNS handler 707 transmits a DNS query to a DNS server through communication interface 1. In operation S1607, the DNS handler 707 determines that a predetermined period of time (e.g., a third threshold time) elapses after the transmission of the DNS query. The DNS handler 707 activates communication interface 2 in operation S1609, and transmits a DNS query to a DNS server through the communication interface 2 in operation S1611. That is, the DNS handler 707 performs operations S1605 to S1611, and thus, may sequentially transmit a DNS query through the plurality of communication interfaces.

In operation S1613, the DNS handler 707 receives a DNS response through the plurality of communication interfaces. In operation S1615, the DNS handler 707 transmits IP address information corresponding to the received DNS response together with identification information of a corresponding communication interface to the URL protocol handler 705. In operation S1617, the URL protocol handler 705 determines the received communication interface identification information, and may determine a communication interface through which the received IP address information has been received. According to the determination, the URL protocol handler 705 may transmit an HTTP request through the communication interface corresponding to the received IP address information.

Figure 17:
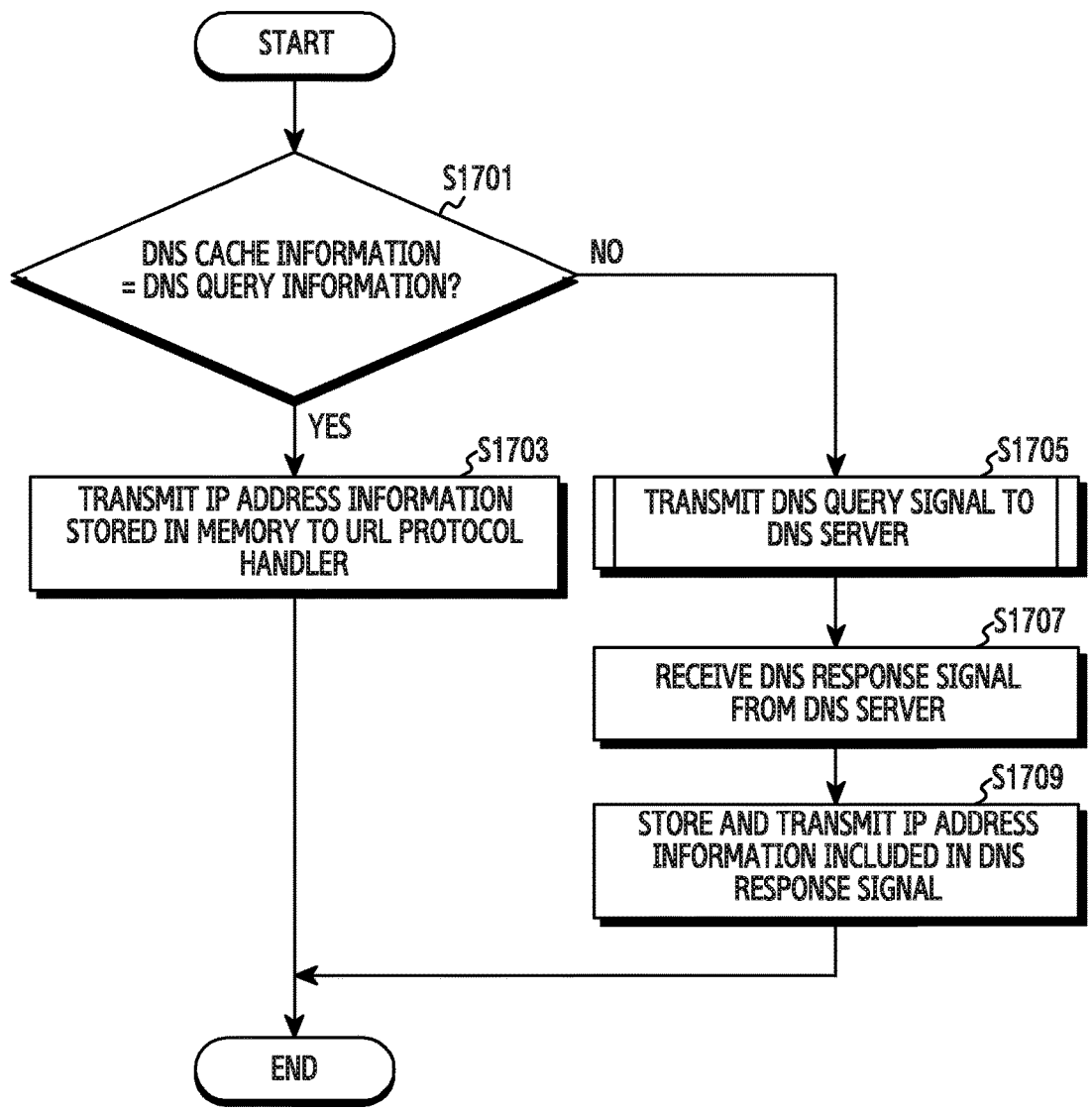
FIG. 17 is a flowchart illustrating a process in which a portable terminal performs a DNS resolution according to an embodiment of the present disclosure.

FIG. 17 is a flowchart illustrating a process in which a portable terminal performs a DNS resolution according to an embodiment of the present disclosure. Referring to FIG. 17, in operation S1701, when the DNS handler 707 receives a DNS query associated with a host from the URL protocol handler 705, the DNS handler 707 compares DNS cache information stored in a memory and DNS query information included in the DNS query. Here, the memory may be an element corresponding to the DNS cache 717 of FIG. 7.

The DNS cache information may include host name information, communication interface identification information, IP version information corresponding to a communication interface, and IP address information corresponding to a host name. The host name information, the communication interface identification information, the IP version information corresponding to the communication interface, and the IP address information corresponding to the host name may be mapped to one another.

For example, as illustrated in FIG. 9, DNS cache information 901 stored in a memory may include IPv6 corresponding to IP version information, ABC corresponding to host name information, Inf0 corresponding to communication interface identification information, and IP0 corresponding to IP address information. As another example, DNS cache information 903 may include IPv4 corresponding IP version information, ABC corresponding to host name information, Inf1 corresponding to communication interface identification information, and IP1 corresponding to IP address information. As another example, DNS cache information 905 may include IPv6 corresponding IP version information, ABC corresponding to host name information, Inf0 and Inf1 corresponding to communication interface identification information, and IP2 and IP3 corresponding to IP address information. That is, the DNS cache information may include a single piece of IP version information and host name information, and a plurality of pieces of different communication interface identification information and a plurality of pieces of different IP address information. As another example, DNS cache information 907 may include IPv6 corresponding IP version information, ABC corresponding to host name information, Inf0 and Inf1 corresponding to communication interface identification information, and IP4 and NoHost corresponding to IP address information. Here, NoHost indicates that IP address information of a host that is mapped to the IP version information, the host name information, and the communication interface identification information does not exist.

The DNS query information may include communication interface identification information, IP version information corresponding to a communication interface, host name information, and the like. The communication interface identification information, the IP version information, and the host name information may be information used for obtaining the IP address information of a host.

When the comparison shows that DNS cache information that matches the DNS query information exists in the plurality of pieces of DNS cache information, the DNS handler 707 may proceed with operation S1703. Otherwise, the DNS handler 707 may proceed with operation S1705.

When the process proceeds with operation S1703, the DNS handler 707 may transmit, to the URL protocol handler 705, IP address information of the matching DNS cache information For example, when IP version information and/or host name information included in each of a plurality of DNS cache information is identical to IP version information and/or host name information included in the DNS query information, the DNS handler 707 may transmit IP address information corresponding to the IP version information and/or host name information to the URL protocol handler 705.

For example, when the IP version information included in the DNS query information is IPv4, the host name is ABC, and the memory includes the DNS cache information 901 to 907, the DNS handler 707 searches for the DNS cache information 903 of which the IP version is IPv4 and the host name is ABC from among the DNS cache information 901 to 907, and transmits communication interface identification information Inf1 and IP address information IP1 included in the retrieved DNS cache information to the URL protocol handler 705.

As another example, when the IP version information included in the DNS query information is IPv6, the host name information is ABC, and the DNS cache information stored in the memory is the DNA cache information 905 of FIG. 9, the DNS handler 707 may transmit communication interface identification information Inf0 and IP address information IP2 included in the DNS cache information 905 to the URL protocol handler 705, or may transmit communication interface identification information Inf1 and IP address information IP3 to the URL protocol handler 705 since the DNS cache information 905 includes Inf0 and Inf1 corresponding to communication interface identification information and IP2 and IP3 corresponding to IP address information, together with IPv6 corresponding to IP version information and ABC corresponding to host name information.

In this instance, when two or more pieces of IP address information corresponding to the IP version information and the host name information included in the DNS query information exist in the DNS cache information, the DNS handler 707 may select a single piece of IP address information according to a predetermined scheme out of a plurality of IP address information, and may transmit the same to the URL protocol handler 705. Here, the predetermined scheme is selecting IP address information that consumes a relatively small amount of power from among the plurality of pieces of IP address information, or selecting IP address information corresponding to communication information having a quick transmission speed from among the IP address information.

For example, when the transmission speed of the Wi-Fi communication interface 719, which corresponds to the communication interface identification information Inf0 out of the information stored in the DNS cache information 905, is faster than the 3G/LTE communication interface 721 corresponding to the communication interface identification information Inf1, the DNS handler 707 transmits IP address information IP2 corresponding to the communication interface identification information Inf0 to the URL protocol handler 705.

As another example, when the IP version information included in the DNS query information is IPv6, the host name information is ABC, and the DNS cache information is the DNA cache information 907 of FIG. 9, the DNS handler 707 may transmit communication interface identification information Inf1 and IP address information IP4 included in the DNS cache information 907 to the URL protocol handler 705 since the DNS cache information 907 includes Inf0 and Inf1 corresponding to communication interface identification information and IP4 and NoHost corresponding to IP address information, together with IPv6 corresponding to IP version information and ABC corresponding to host name information. In this instance, the IP address information that matches the communication interface identification information Inf0 does not exist (NoHost), and thus, the DNS handler 707 may not transmit the communication interface identification information Inf0 and NoHost information corresponding thereto to the URL protocol handler 705.

When the process proceeds with operation S1705, the DNS handler 707 transmits a DNS query to a DNS server through at least one communication interface. Operation S1705 will be described through FIG. 18.

In operation S1707, the DNS handler 707 receives a DNS response including IP address information from the DNS server in response to the DNS query. In this instance, the DNS handler 707 receives the DNS response from the DNS server in response to the DNS query, through a network. The DNS response may be received through a communication interface that transmits the DNS query to the DNS server. For example, when a DNS query is transmitted to a DNS server trough the Wi-Fi communication interface 719, the DNS handler 707 may receive a DNS response through the Wi-Fi communication interface 719. As another example, when a DNS query is transmitted to a DNS server through the 3 G/LTE communication interface 721, the DNS handler 707 receives a DNS response through the 3G/LTE communication interface 721.

In operation S1709, the DNS handler 707 stores IP address information included in the received DNS response, and transmits the same to the URL protocol handler 705. For example, when a DNS response is received through each of a plurality of communication interfaces, the DNS handler 707 may transmit, to the URL protocol handler 705, IP address information corresponding to a DNS response received first.

In this instance, the DNS handler 707 may transmit, to the URL protocol handler 705, the IP address information and communication interface identification information of a communication interface through which the DNS response is received. For example, when a DNS response is received through the 3G/LTE communication interface 721, the DNS handler 707 may transmit IP address information included in the received DNS response and identification information of the 3G/LTE communication interface 721, to the URL protocol handler 705. Accordingly, the URL protocol handler 705 may determine the IP address information and the communication interface identification information, and may determine a communication interface through which the first received IP address information has been received. Also, the URL protocol handler 705 may transmit an HTTP request through the communication interface corresponding to the IP address information received first.

According to an embodiment, the IP address information included in the received DNS response may be stored in the memory, as DNS cache information. The DNS cache information may include IP version information corresponding to the received DNS response, host name information, communication interface identification information, and IP address information received from the DNS server. The DNS cache information stored in the memory may be used as information for a subsequent DNS resolution.

Figure 18:
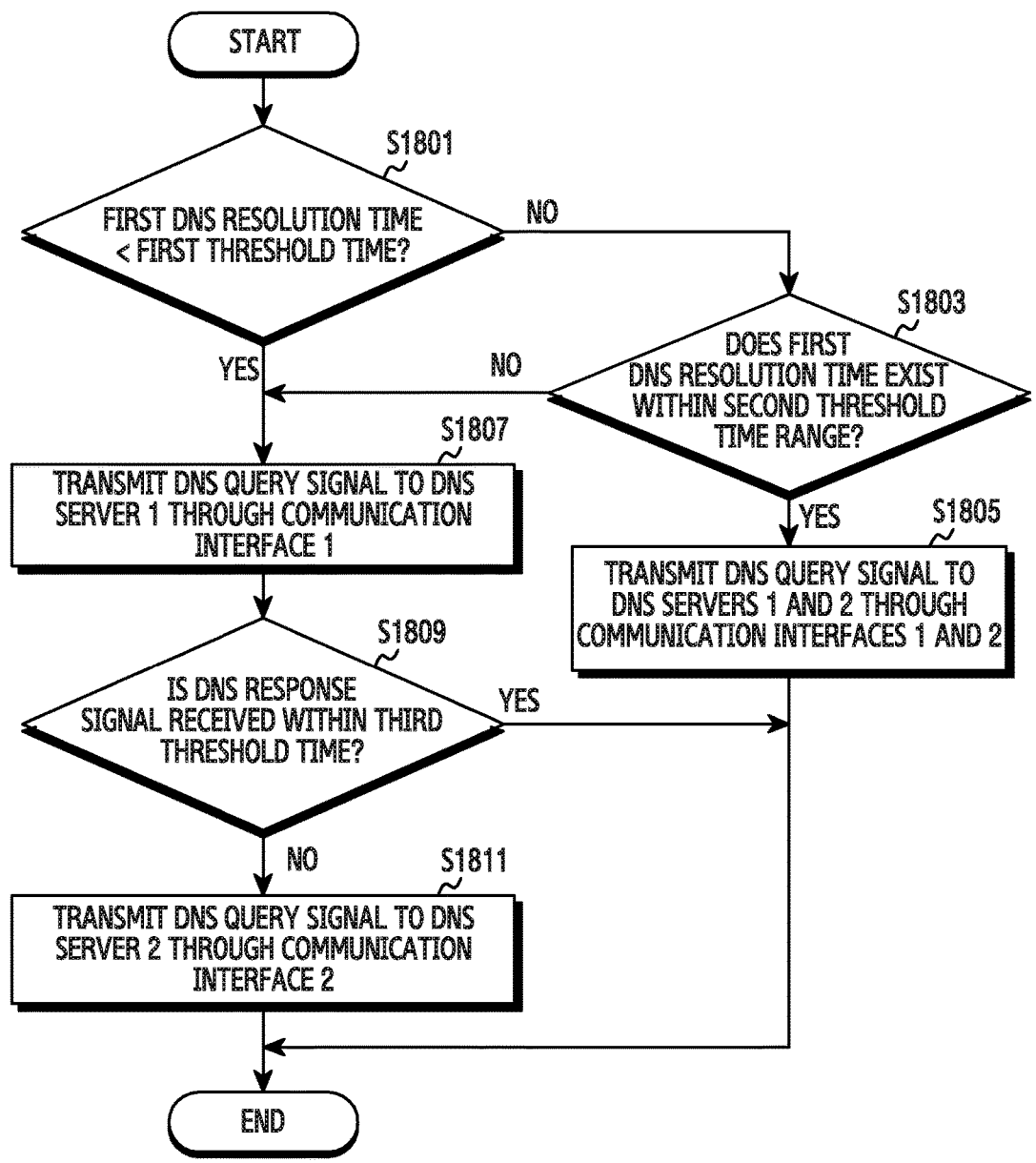
FIG. 18 is a flowchart illustrating a process in which a portable terminal transmits a DNS query signal to a DNS server according to an embodiment of the present disclosure.

FIG. 18 is a flowchart illustrating a process in which a portable terminal transmits a DNS query signal to a DNS server according to an embodiment of the present disclosure. Particularly, when two or more types of communication interfaces exist, the DNS handler 707 may determine at least one communication interface from among a plurality of communication interfaces, and may transmit a DNS query to a DNS server through the determined communication interface.

In this instance, the DNS handler 707 may determine one of the plurality of communication interfaces according to a predetermined scheme. Here, the predetermined scheme may be selecting a communication interface that consumes a relatively small amount of power from among the plurality of communication interfaces, or selecting a communication interface having a fast transmission speed. For example, when the Wi-Fi communication interface 719 and the 3 G/LTE communication interface 721 exist, and the transmission speed of the Wi-Fi communication interface 719 is faster than the 3G/LTE communication interface 721, the DNS handler 707 may determine the Wi-Fi communication interface 719 as a communication interface used for transmitting a DNS query to a DNS server.

Referring to FIG. 18, in operation S1801, the DNS handler 707 determines whether a first DNS resolution time (Inf1 Time) through communication interface 1 corresponding to one of two or more communication interfaces is less than or equal to a first threshold time. Here, the first DNS resolution time indicates an amount of time expended for a previous DNS resolution through the communication interface 1. That is, the first DNS resolution time indicates a period of time that elapses while a DNS resolution is achieved through the communication interface 1 in a previous process. The first DNS resolution time may be stored in the network state manager 711, which will be described later. For example, as illustrated in FIG. 14, the DNS handler 707 may determine whether a first DNS resolution time 1403 (Inf1 Time) of the communication interface 1 is less than or equal to a first threshold time (Min Threshold 1).

When the determination shows that the first DNS resolution time is less than or equal to the first threshold time, the DNS handler 707 proceeds with operation S1807. Otherwise, the DNS handler 707 proceeds with operation S1803.

When the process proceeds with operation S1803, the DNS handler 707 may determine whether the first DNS resolution time is within a second threshold time range based on a second DNS resolution time through communication interface 2, which corresponds to another one of the two or more communication interfaces. Here, the second DNS resolution time indicates an amount of time expended for a previous DNS resolution through the communication interface 2. That is, the second DNS resolution indicates a period of time that elapses while a DNS resolution is achieved through the communication interface 2 in a previous process. The second DNS resolution time may be stored in the network state manager 711. For example, as illustrated in FIG. 14, the DNS handler 707 may determine whether the first DNS resolution time is within the second threshold time range (Threshold2) of the second DNS resolution time (Inf2 Time) when the first DNS resolution time 1401 of the communication interface 1 is greater than the first threshold time (Min Threshold1).

When the determination shows that the first DNS resolution time is within the second threshold time range, the DNS handler 707 proceeds with operation S1805. Otherwise, the DNS handler 707 proceeds with operation S1807.

When the process proceeds with operation S1805, the DNS handler 707 may transmit a DNS query to DNS server 1 and DNS server 2 through the communication interface 1 and the communication interface 2. For example, as illustrated in the diagram (a) of FIG. 14, when the first DNS resolution time (Inf1 Time) of the communication interface 1 exceeds the first threshold time (Min Threshold1) and is within the second threshold time range (Threshold2) of the second DNS resolution time (Inf2 Time) of the communication interface 2, the DNS handler 707 may respectively transmit a DNS query to the DNS server 1 and the DNS server 2 through all communication interfaces (Wi-Fi and 3G/LTE), as illustrated in the diagram (a) of FIG. 15.

When the process proceeds with operation S1807, the DNS handler 707 transmits a DNS query to the DNS server 1 through communication interface 1.

For example, as illustrated in the diagram (b) of FIG. 14, when the first DNS resolution time (Inf1 Time) of the communication interface 1 is less than or equal to the first threshold time (Min Threshold1), the DNS handler 707 may transmit a DNS query to the DNS server 1 through the communication interface 1 (WiFi), as illustrated in the diagram (b) of FIG. 15. As another example, as illustrated in the diagram (c) of FIG. 14, when the first DNS resolution time (Inf1 Time) of the communication interface 1 is greater than the first threshold time (Min Threshold1) and is out of the second threshold time range (Threshold2) of the second DNS resolution time (Inf2 Time) of the communication interface 2, the DNS handler 707 may transmit a DNS query to the DNS server 2 through the communication interface 1 (Wi-Fi), as illustrated in the diagram (b) of FIG. 15.

In operation S1809, the DNS handler 707 determines whether a DNS response to the transmitted DNS query is received within a third threshold time. Here, the third threshold time may indicate an average time for a DNS resolution. The average time for a DNS resolution may indicate a value obtained by dividing the sum of DNS resolution times by the number of DNS resolutions.

When the determination shows that the DNS response is received within the third threshold time, the DNS handler 707 terminates a DNS query transmission procedure. Unlike the above, when the DNS response is not received within the third threshold time, the DNS handler 707 may proceed with operation S1811.

In operation S1811, the DNS handler 707 transmits a DNS query to the DNS server 2 through the communication interface 2 from among two or more communication interfaces. When the DNS response is not received within the third threshold time after the DNS query is transmitted to the DNS server 1 through the communication interface 1, it may indicate that the transmission speed of the communication interface 1 is slow. Therefore, in this instance, as illustrated in the diagram (c) of FIG. 15, the DNS handler 707 transmits a DNS query to the DNS server 2 through another communication interface, which is different from the communication interface 1 (Wi-Fi), that is, the communication interface 2 (3G/LTE).

Figure 19:
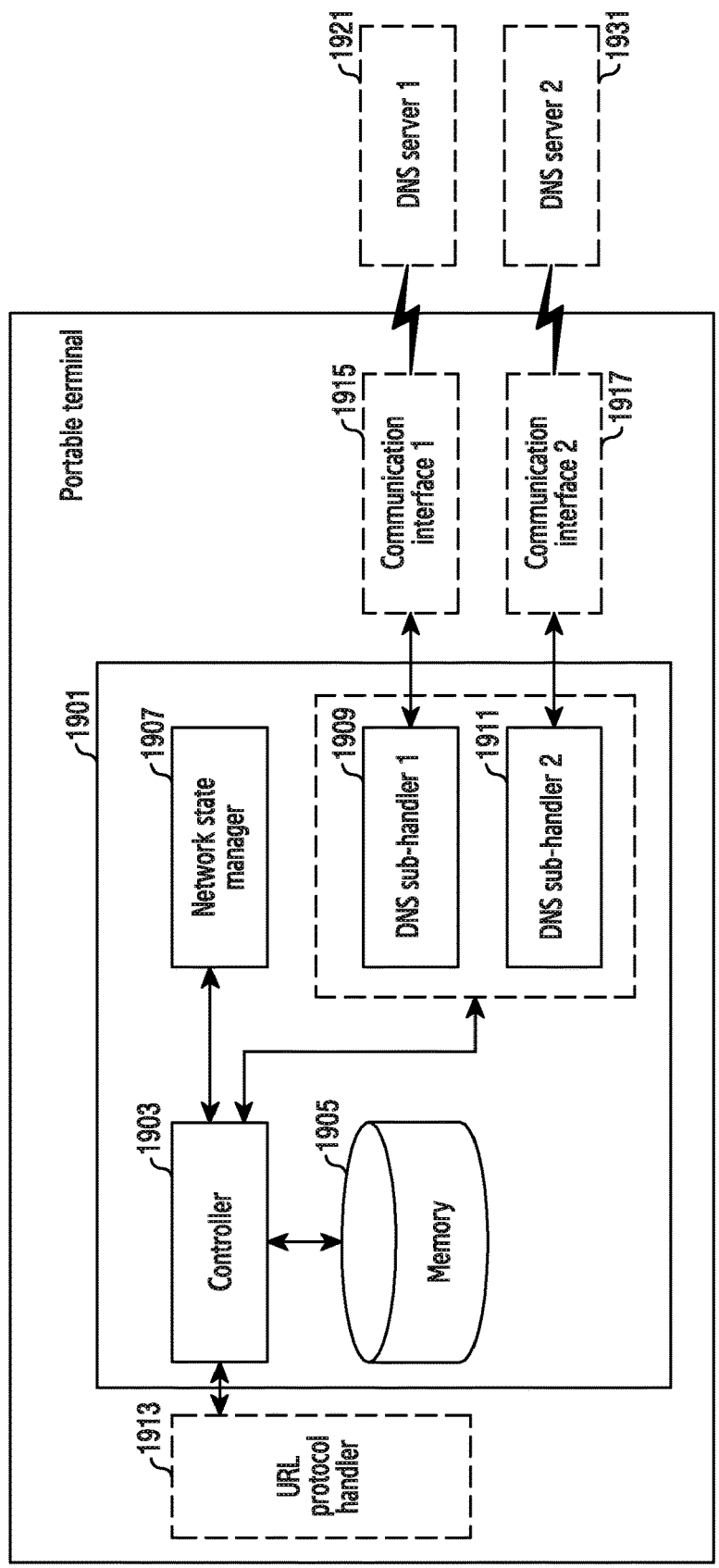
FIG. 19 is a block diagram of a portable terminal according to an embodiment of the present disclosure.

FIG. 19 is a block diagram of a portable terminal according to an embodiment of the present disclosure.

A DNS resolution device 1901 according to the present disclosure is contained in a portable terminal, and the portable terminal includes a URL protocol handler 1913, communication interface 1 1915, and communication interface 2 1917, in addition to the DNS resolution device 1901. Elements for general operations of the portable terminal are not illustrated. As other elements, for ease of description, the DNS server 1 1921 and the DNS server 2 1931 are illustrated. Although FIG. 19 illustrates two DNS sub-handlers and communication interfaces, respectively, this is merely an example and the number thereof may be increased.

Here, the portable terminal may include a smailphone, a tablet personal computer (PC), a mobile phone, a video phone, an e-book reader, a netbook computer, a personal digital assistant (PDA), a portable multimedia player (PMP), an MP3 player, a mobile medical device, a camera, or a wearable device (e.g., a head-mounted-device (HMD), such as electronic glasses, electronic clothes, an electronic bracelet, an electronic necklace, an electronic appcessory, an electronic tattoo, or a smart watch), or the like.

The DNS resolution device 1901 may include a memory 1905, a controller 1903, a network state manager 1907, DNS sub-handler 1 1909, and DNS sub-handler 2 1911.

The memory 1905 stores DNS cache information. The memory 1905 may map host name information, communication interface identification information, IP version information corresponding to a communication interface, and IP address information corresponding to a host name to one another, and may store the same. The DNS cache information may include identical IP version information and host name information, communication interface identification information, and IP address information. The memory 1905 may store at least one piece of DNS cache information.

When a DNS query associated with a host is received from the URL protocol handler 1913, the controller 1903 may compare DNS cache information stored in the memory 1905 with DNS query information included in the DNS query, and transmits IP address information corresponding to the host to the URL protocol handler 1913, according to a result of the comparison between the DNS cache information and the DNS query information. Here, the DNS query information may include communication interface identification information, IP version information, and host name information, and the like.

The controller 1903 may access the memory 1905, and may transmit IP address information corresponding to IP version information and/or host name information to the URL protocol handler 1913 when the IP version information and/or host name information included in the DNS cache information is identical to IP version information and/or host name information included in the DNS query information.

When two or more pieces of IP address information corresponding to the IP version information and the host name information exist, the controller 1903 may transmit, to the URL protocol handler 1913, IP address information according to a predetermined scheme out of the two or more pieces of IP address information. In this instance, the controller 1903 may transmit, to the URL protocol handler 1913, IP address information that consumes a relatively small amount of power or IP address information corresponding to a communication interface having a quick transmission speed, from among the two or more pieces of IP address information.

The DNS sub-handler 1 1909 and the DNS sub-handler 2 1911 may transmit a DNS query to the DNS server 1 1921 and the DNS server 2 1931 through the communication interface 1 1915 and the communication interface 2 1917, respectively, according to the control of the controller 1903.

The controller 1903 may access the memory 1905, and may perform a control to transmit a DNS query to the DNS server 1 1921 and the DNS server 2 1931 through at least one of the communication interface 1 1915 and the communication interface 2 1917 when the IP version information and host name information included in the DNS cache information are different from the IP version information and host name information included in the DNS query information. Subsequently, when a DNS response including IP address information corresponding to the DNS query is received from the DNS server 1 1921 and/or the DNS server 2 1931 through one or more communication interfaces, the controller 1903 may transmit the IP address information included in the received DNS response to the URL protocol handler 1913.

When two or more communication interfaces exist, the controller 1903 may determine at least one communication interface out of two or more communication interfaces, and may transmit a DNS query to a DNS server through the determined communication interface. The controller 1903 may determine a communication interface that consumes a relatively smaller amount of power or a communication interface having a high transmission speed from among two or more communication interfaces, as the communication interface through which the DNS query is to be transmitted.

The network state manager 1907 may store and manage a DNS resolution time, which indicates an amount of time expended for a previous DNS resolution through at least one communication interface. The network state manager 1907 may store and manage a DNS resolution time by distinguishing a DNS resolution time based on a communication interface through which a corresponding DNS resolution is performed. For example, the network state manager 1907 may store a first DNS resolution time according to a DNS resolution performed through the communication interface 1 1915, and may store a second DNS resolution time according to a DNS resolution performed through the communication interface 2 1917.

The controller 1903 may access the network state manager 1907, may determine whether the first DNS resolution time through the communication interface 1 1915, which is one of two or more communication interfaces, is less than or equal to a first threshold time, and may perform a control to transmit a DNS query to the DNS server 1 1921 corresponding to the communication interface 1 1915, through the communication interface 1 1915, when the first DNS resolution time is less than or equal to the first threshold time.

When the first DNS resolution time is greater than the first threshold time, the controller 1903 determines whether the first DNS resolution time is within a second threshold time range of the second DNS resolution time through the communication interface 2 1917, which is another communication interface from among the two or more communication interfaces, and performs a control to transmit a DNS query signal to the DNS server 1 1921 through the communication interface 1 1915 when the first DNS resolution time is out of the second threshold time range.

When the first DNS resolution time is within the second threshold time range, the controller 1903 may perform a control to transmit a DNS query signal to the DNS server 1 1921 and the DNS server 2 1931 through the communication interface 1 1915 and the communication interface 2 1917, respectively.

The controller 1903 determines whether a DNS response is received within a third threshold time in response to the DNS query, after transmitting the DNS query trough the determined communication interface, and performs a control to transmit a DNS query to a DNS server through one out of two or more communication interfaces when the DNS response is not received within the third threshold time. The third threshold time may indicate an average time for a DNS resolution.

When the DNS response to the DNS query is received through two or more communication interfaces, the controller 1903 may transmit IP address information corresponding to a DNS response received first to the URL protocol handler 1913. In this instance, the controller 1903 may transmit, to the URL protocol handler 1913, the IP address information together with identification information of a communication interface that receives the DNS response from among two or more communication interfaces.

The controller 1903 may perform a control to store the IP address information included in the received DNS response in the memory 1905, as DNS cache information. The controller 1903 may perform a control to map the IP version information, host name information, and communication interface identification information corresponding to the received DNS response to the IP address information, and to store the same.

According to the present disclosure, the following operational characteristics in association with a DNS resolution may exist.

Figure 20:
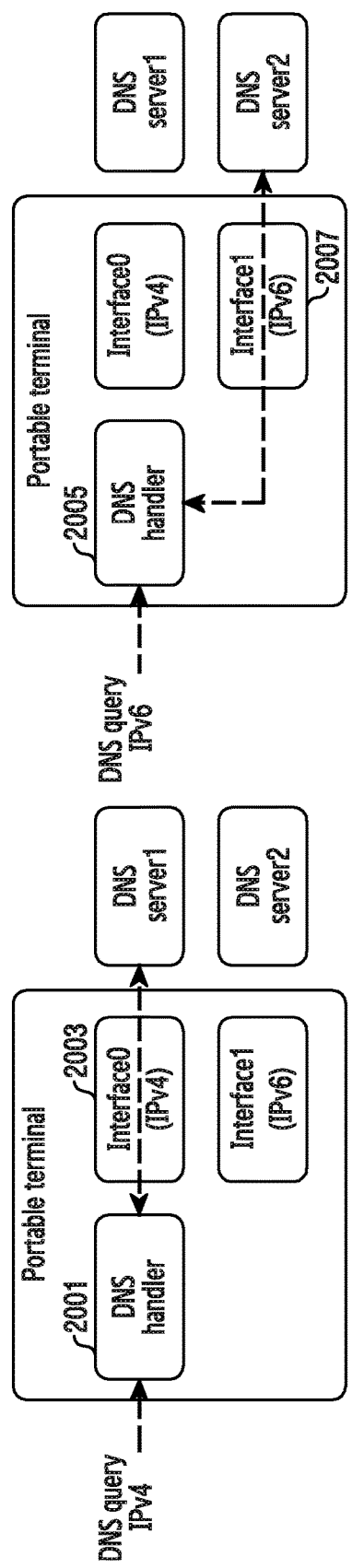
FIG. 20 is a block diagram of a portable terminal including a plurality of communication interfaces having IP versions different from each other, according to an embodiment of the present disclosure.

FIG. 20 is a block diagram of a portable terminal including a plurality of communication interfaces that have IP versions different from each other, according to an embodiment of the present disclosure.

Referring to FIG. 20, communication interface 0 2003 corresponds to IPv4, and communication interface 1 corresponds to IPv6. For example, when a DNS handler 2001 receives a DNS query associated with IPv4, the DNS query may be transmitted to DNS server 1 through the communication interface 0 2003 and a DNS response corresponding to the DNS query may be received from the DNS server 1 through the communication interface 0 2003. As another example, when a DNS handler 2005 receives a DNS query associated with IPv6, the DNS query may be transmitted to DNS server 2 through the communication interface 1 2007, and a DNS response corresponding to the DNS query may be received from the DNS server 2 through the communication interface 1 2007.

Figure 21:
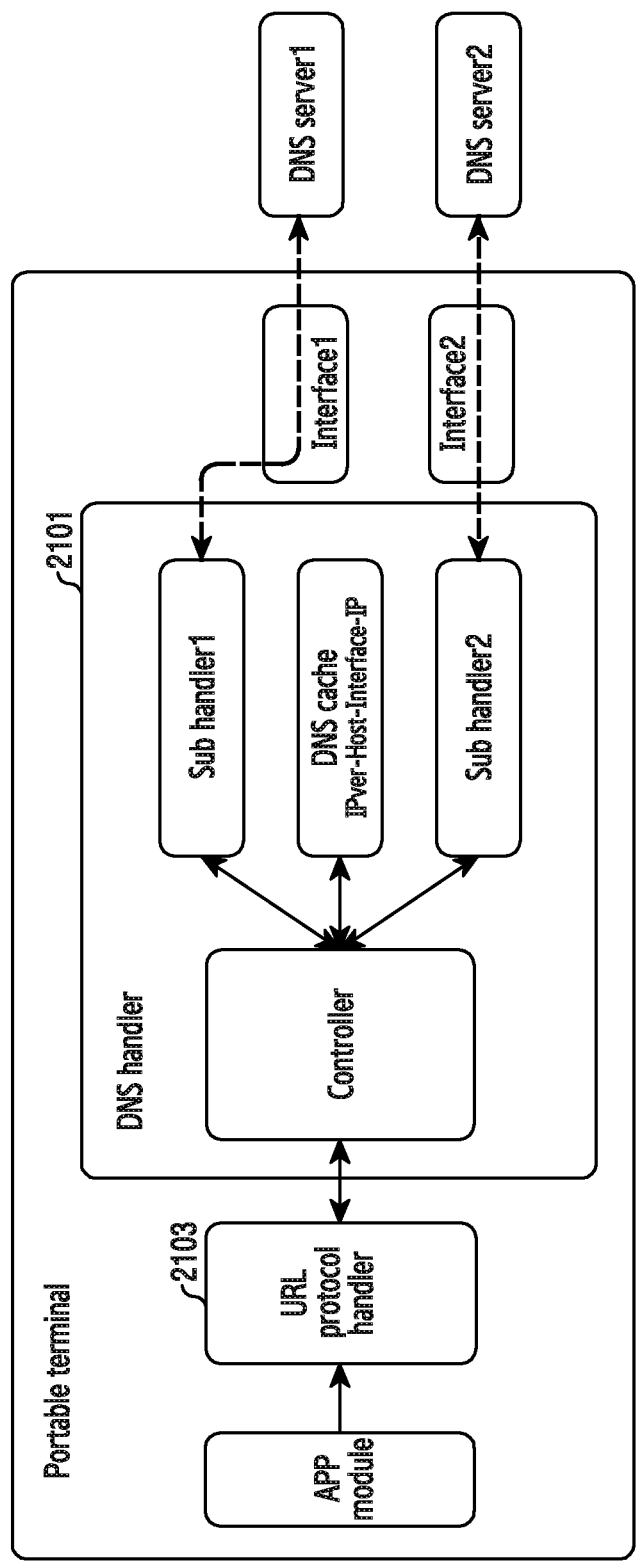
FIG. 21 is a diagram illustrating a DNS resolution performed in a portable terminal according to a first embodiment of the present disclosure.

FIG. 21 is a diagram illustrating a DNS resolution performed in a portable terminal according to a first embodiment of the present disclosure.

Referring to FIG. 21, when a controller of a DNS handler 2101 receives a DNS query from a URL protocol handler 2103, the controller may determine whether IP address information corresponding to the DNS query exists from among IP address information stored in a DNS cache.

When the determination shows that the IP address information does not exist, the controller may transmit a DNS query to DNS servers 1 and 2 through a plurality of DNS sub-handlers 1 and 2 and communication interfaces 1 and 2, and transmits, to the URL protocol handler 2103, IP address information included in a DNS response received first from the DNS servers 1 and 2. According to the above, a DNS resolution may be promptly performed according to the transmission speed of each of the communication interfaces 1 and 2.

Figure 22:
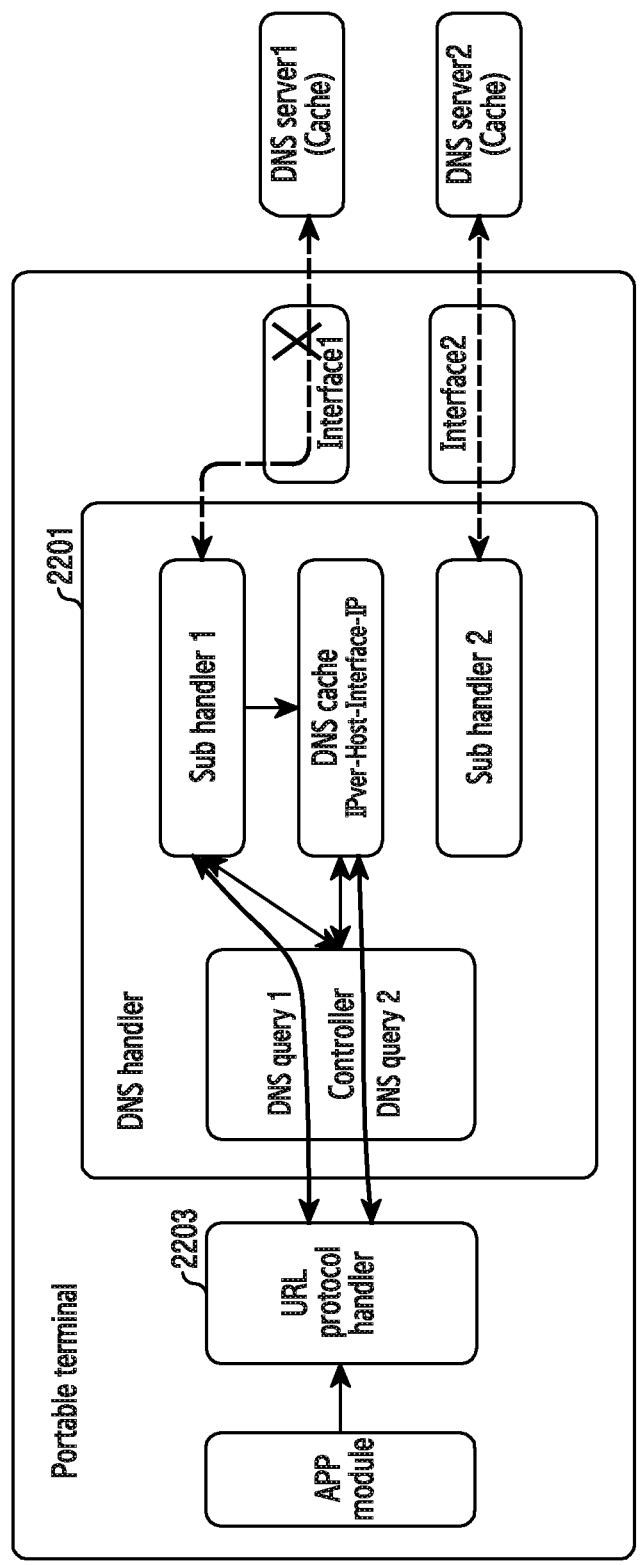
FIG. 22 is a diagram illustrating a DNS resolution performed in a portable terminal according to a second embodiment of the present disclosure.

FIG. 22 is a diagram illustrating a DNS resolution performed in a portable terminal according to a second embodiment of the present disclosure.

Referring to FIG. 22, when a controller of a DNS handler 2201 receives DNS query 1 associated with a predetermined host from a URL protocol handler 2203, the controller may transmit the DNS query 1 to DNS server 1 through communication interface 1 using sub-handler 1. The controller may receive a DNS response from the DNS server 1 through the communication interface 1 using the sub-handler 1, in response to the DNS query 1, may store IP address information included in the received DNS response in a DNS cache, and may transmit the same to the URL protocol handler 2203.

Subsequently, when the controller receives DNS query 2 associated with a predetermined host from the URL protocol handler 2203, the controller may search for IP address information corresponding to the DNS query from among IP address information stored in the DNS cache. For example, when the DNS queries 1 and 2 are DNS queries associated with the same host, the controller may detect IP address information corresponding to the DNS query 1 from the DNS cache, and may transmit the same to the URL protocol handler 2203.

According to the above, a DNS resolution may be promptly performed without an access to a communication interface and a DNS server corresponding thereto.

Figure 23:
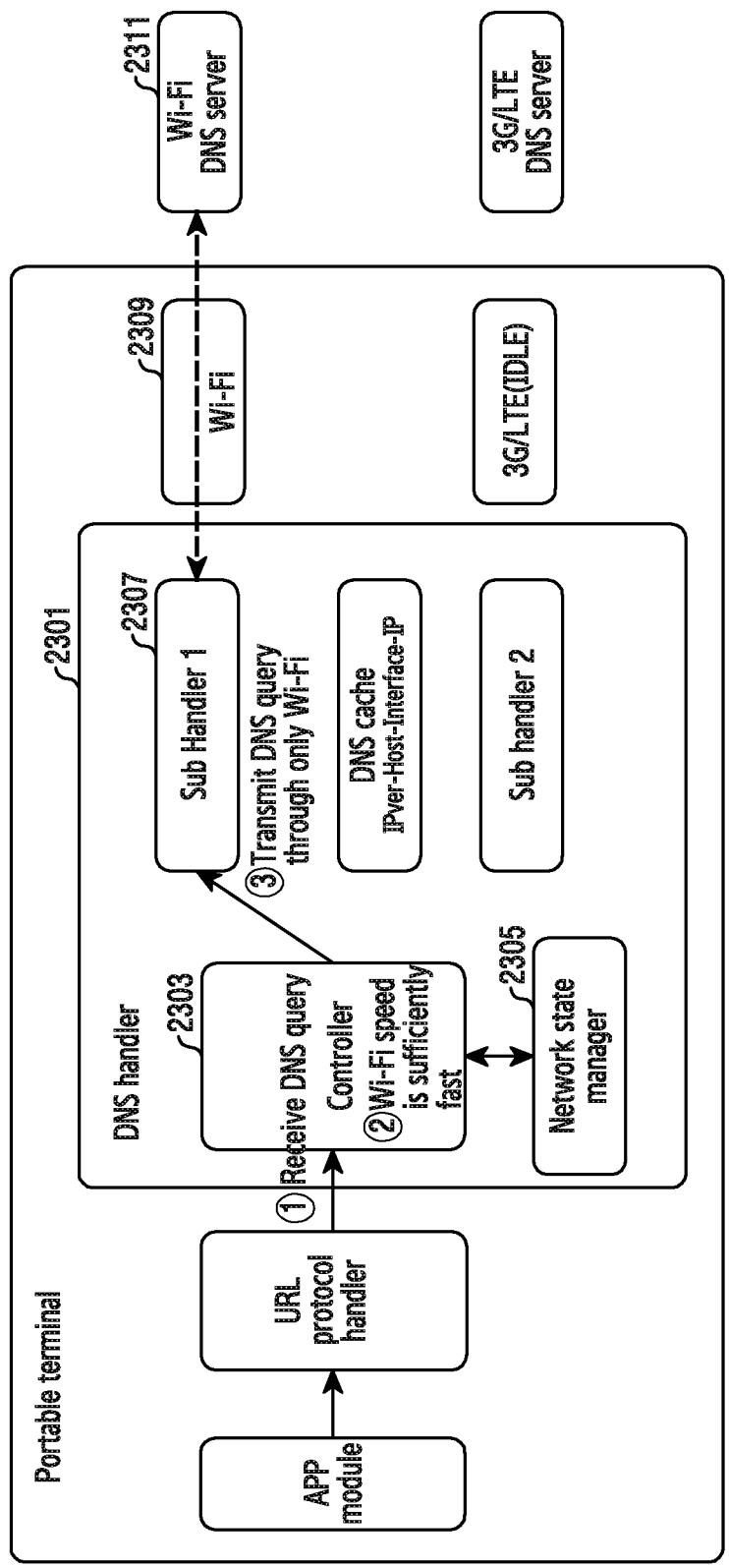
FIG. 23 is a diagram illustrating a DNS resolution performed in a portable terminal according to a third embodiment of the present disclosure.

FIG. 23 is a diagram illustrating a DNS resolution performed in a portable terminal according to a third embodiment of the present disclosure.

Referring to FIG. 23, when a controller 2303 of a DNS handler 2301 receives a DNS query from a URL protocol handler, the controller may determine a communication interface having a high transmission speed from among a plurality of communication interfaces (Wi-Fi and 3G/LTE). For example, the controller 2303 may determine a communication interface based on DNS resolution time information for each communication interface stored in the network state manager 2305.

When a Wi-Fi communication interface is determined as a communication interface having a high transmission speed, the controller 2303 may transmit a DNS query to a Wi-Fi DNS server 2311 through a Wi-Fi communication interface 2309 using a sub-handler 2307.

As described above, the controller 2303 may perform a DNS resolution by transmitting a DNS query through only the Wi-Fi communication interface, and a 3G/LTE communication interface may maintain an idle state. Accordingly, power may not be consumed since the 3G/LTE communication interface is deactivated.

Figure 24:
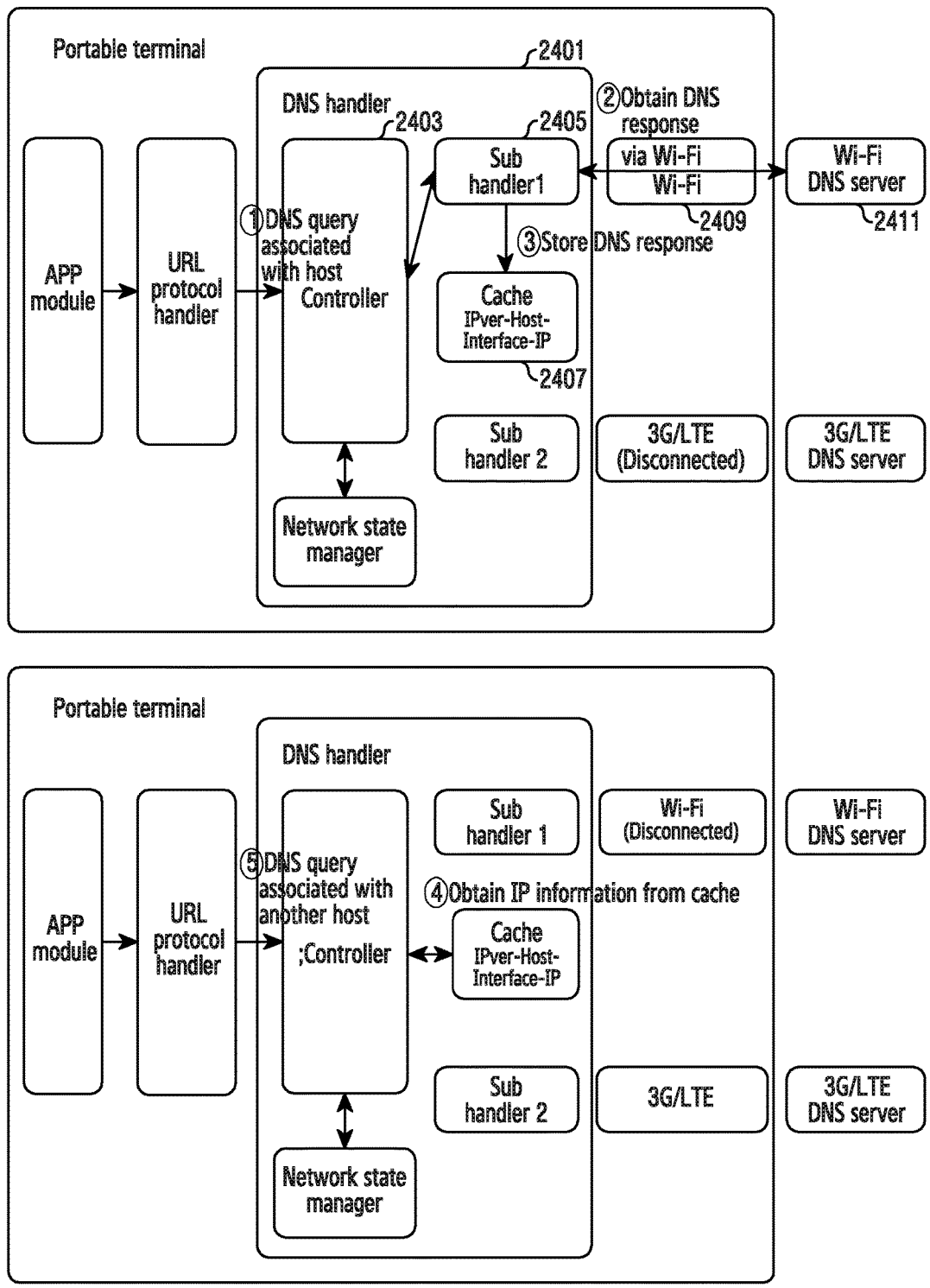
FIG. 24 is a diagram illustrating a DNS resolution performed in a portable terminal according to a fourth embodiment of the present disclosure.

FIG. 24 is a diagram illustrating a DNS resolution performed in a portable terminal according to a fourth embodiment of the present disclosure.

Referring to FIG. 24, a controller 2403 of a DNS handler 2401 may receive a DNS query associated with a host from a URL protocol handler. The controller 2403 may transmit a DNS query to a Wi-Fi DNS server 2411 through a Wi-Fi communication interface 2409 using a sub-handler 1 2405. The controller 2403 may receive a DNS response from the Wi-Fi DNS server 2411, may generate IP address information (e.g., DNS cache information) based on the received DNS response, and may store the same in a DNS cache 2407.

Subsequently, when the DNS handler 2401 receives a DNS query associated with another host from the URL protocol handler, the DNS handler 2401 may perform a DNS resolution using IP address information (e.g., DNS cache information) stored in the DNS cache 2407 even though no communication interface is connected to a network.

Figure 25:
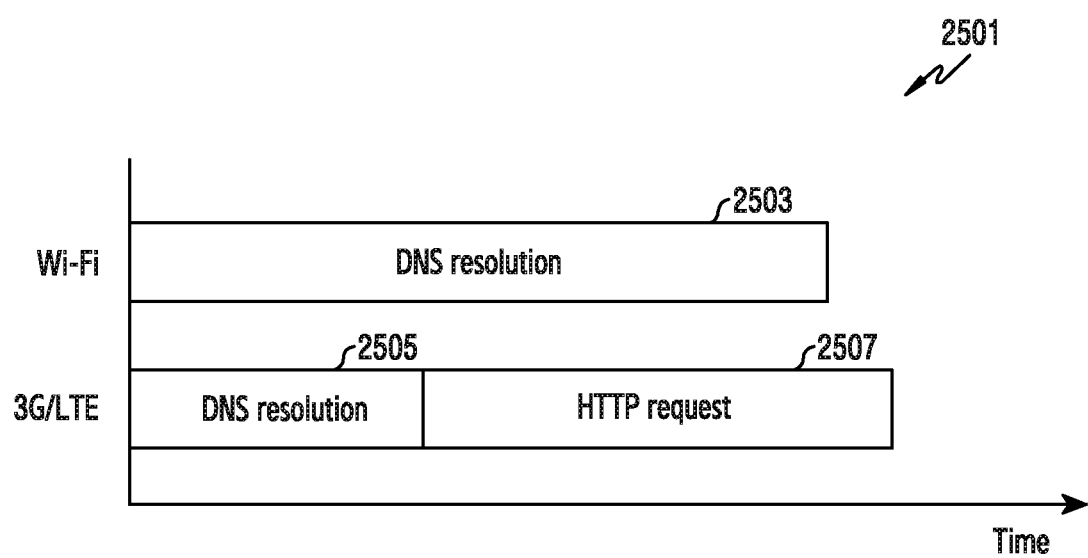
FIG. 25 is a graph illustrating a DNS resolution time for each communication interface according to an embodiment of the present disclosure.

FIG. 25 is a graph illustrating a DNS resolution time for each communication interface according to an embodiment of the present disclosure.

Referring to a graph 2501 of FIG. 25, a URL protocol handler may preferentially transmit a URL query (HTTP request) 2507 through a communication interface (e.g., 3G/LTE communication interface) corresponding to a short DNS resolution time from among DNS resolution times 2503 and 2505 of two or more communication interfaces.

Figure 26:
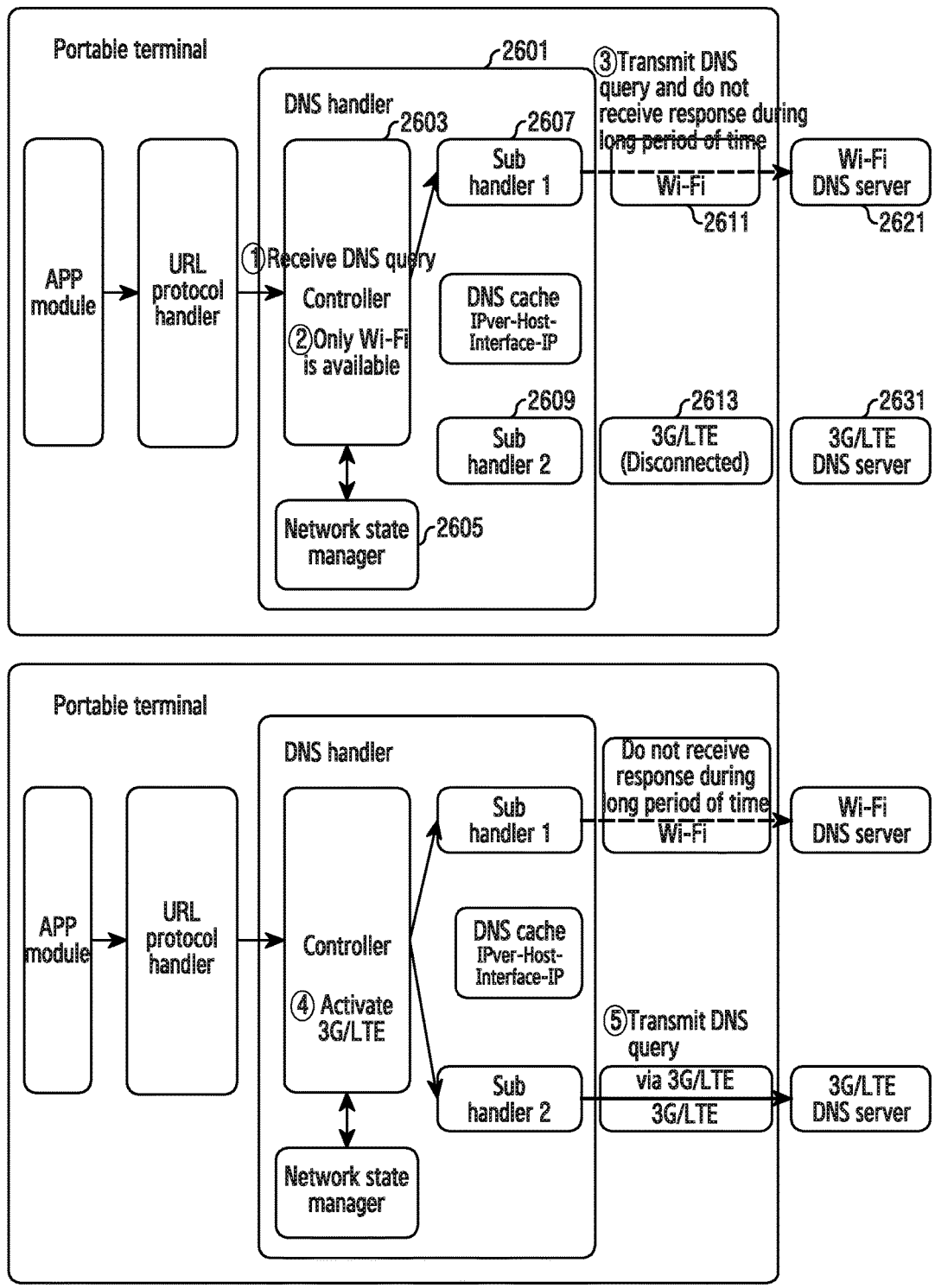
FIG. 26 is a diagram illustrating a DNS resolution performed in a portable terminal according to a fifth embodiment of the present disclosure.

FIG. 26 is a diagram illustrating a DNS resolution performed in a portable terminal according to a fifth embodiment of the present disclosure.

Referring to FIG. 26, when a controller 2603 of a DNS handler 2601 receives a DNS query from a URL protocol handler, the controller 2603 may determine an available communication interface (e.g., the Wi-Fi communication interface 2611) based on DNS resolution time information for each communication interface included in a network state manager 2605. The controller 2603 may transmit a DNS query to a Wi-Fi DNS server 2621 through the Wi-Fi communication interface 2611 using a sub-handler 1 2607.

Subsequently, when a DNS response is not received through the Wi-Fi communication interface 2621 within a predetermined period of time (e.g., a third threshold time), the controller 2603 may transmit a DNS query to a 3G/LTE DNS server 2631 through a 3G/LTE communication interface 2613, which is another communication interface, using a sub-handler 2 2609. Accordingly, the DNS handler 2601 may promptly receive a DNS response through the 3G/LTE communication interface 2631.

Methods according to embodiments stated in the claims and/or specifications may be implemented by hardware, software, or a combination of hardware and software. In the implementation of software, a computer-readable storage medium for storing one or more programs (software modules) may be provided. The one or more programs stored in the computer-readable storage medium may be configured for execution by one or more processors within the electronic device. The one or more programs may include instructions for allowing the electronic device to perform methods according to embodiments stated in the claims and/or specifications of the present disclosure.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. The storage device may access the electronic device through an external port. Further, a separate storage device on a communication network may access a portable electronic device.

Various embodiments of the present disclosure may minimize an amount of time expended for a current DNS resolution by using IP address information stored by a previous DNS resolution.

Also, various embodiments of the present disclosure may perform a DNS resolution through a communication interface having a high transmission speed from among a plurality of communication interfaces, thereby providing a high speed HTTP access. Also, various embodiments of the present disclosure may maintain a communication interface, which is not selected from a plurality of communication interfaces, in a deactivated state, thereby minimizing an amount of power consumption of a portable terminal.

The invention claimed is:

1. An operation method of a terminal in a wireless communication system, the method comprising:
 comparing domain name service (DNS) cache information stored in the terminal and DNS query information included in a DNS query associated with a host if the DNS query is provided from a uniform resource locator (URL) protocol handler;
 if host name information included in the DNS cache information is different from host name information included in the DNS query information, determining whether a first DNS resolution time indicating a previous DNS resolution time through a first communication interface from among a plurality of communication interfaces is less than or equal to a previously designated first threshold time; and
 transmitting the DNS query to a first DNS server corresponding to the first communication interface through the first communication interface when the first DNS resolution time is less than or equal to the first threshold time,
 wherein the DNS cache information stored in the terminal is set based on at least one of a transmission speed and an amount of power consumption.

2. The method of claim 1, wherein the DNS cache information includes at least one of host name information, communication interface identification information, IP version information corresponding to a communication interface, or IP address information corresponding to a host name.

3. The method of claim 1, wherein the DNS query information includes at least one of communication interface identification information, IP version information corresponding to a communication interface, or host name information.

4. The method of claim 1, further comprising:
 if host name information included in the DNS cache information is identical to host name information included in the DNS query information, providing the IP address information corresponding to the host name information to the URL protocol handler.

5. The method of claim 1, further comprising:
 if IP version information and host name information included in the DNS cache information are identical to IP version information and host name information included in the DNS query information, providing the IP address information corresponding to the IP version information and the host name information to the URL protocol handler.

6. The method of claim 1, further comprising:
 receiving a DNS response in response to the DNS query from the DNS server to store the DNS response; and
 providing IP address information included in the stored DNS response to the URL protocol handler.

7. The method of claim 6, further comprising:
 determining whether the DNS response in response to the DNS query is received within a previously designated third threshold time; and
 transmitting the DNS query through another communication interface from among a plurality of communication interfaces if the DNS response is not received within the third threshold time.

8. The method of claim 1, further comprising:
 if the first DNS resolution time exceeds the first threshold time, determining whether the first DNS resolution time exists within a second threshold time range of a second DNS resolution time indicating a previous DNS resolution time through a second communication interface from among the plurality of communication interfaces; and
 transmitting the DNS query to the first DNS server through the first communication interface when the first DNS resolution time does not exist within the second threshold time range.

9. The method of claim 8, further comprising:
if the first DNS resolution time exists within the second threshold time range, transmitting the DNS query to the first DNS server and a second DNS server corresponding to the second communication interface through the first communication interface and the second communication interface, respectively.

10. An apparatus of a terminal in a wireless communication system, the apparatus comprising:
a memory configured to store domain network service (DNS) cache information; and
a controller configured to:
compare the stored domain name service (DNS) cache information and DNS query information included in a DNS query associated with a host if receiving the DNS query from a uniform resource locator (URL) protocol handler,
when host name information included in the DNS cache information is different from host name information included in the DNS query information, determine whether a first DNS resolution time indicating a previous DNS resolution time through a first communication interface from among a plurality of communication interfaces is less than or equal to a previously designated first threshold time, and
transmit the DNS query to a first DNS server corresponding to the first communication interface through the first communication interface when the first DNS resolution time is less than or equal to the first threshold time,
wherein the DNS cache information stored in the terminal is set based on at least one of a transmission speed and an amount of power consumption.

11. The apparatus of claim 10, wherein the DNS cache information includes at least one of host name information, communication interface identification information, IP version information corresponding to a communication interface, or IP address information corresponding to a host name.

12. The apparatus of claim 10, wherein the DNS query information includes at least one of communication interface identification information, IP version information corresponding to a communication interface, or host name information.

13. The apparatus of claim 10, wherein the controller is further configured to:
if host name information included in the DNS cache information is identical to host name information included in the DNS query information, provide the IP address information corresponding to the host name information to the URL protocol handler.

14. The apparatus of claim 10, wherein the controller is further configured to:
if IP version information and host name information included in the DNS cache information are identical to IP version information and host name information included in the DNS query information, provide the IP address information corresponding to the IP version information and the host name information to the URL protocol handler.

15. The apparatus of claim 10, wherein the controller is further configured to:
receive a DNS response in response to the DNS query from the DNS server to store the DNS response, and
provide IP address information included in the stored DNS response to the URL protocol handler.

16. The apparatus of claim 15, wherein the controller is further configured to:
determine whether the DNS response in response to the DNS query is received within a previously designated third threshold time, and
transmit the DNS query through another communication interface from among a plurality of communication interfaces if the DNS response is not received within the third threshold time.

17. The apparatus of claim 10, wherein the controller is further configured to:
if the first DNS resolution time exceeds the first threshold time, determine whether the first DNS resolution time exists within a second threshold time range of a second DNS resolution time indicating a previous DNS resolution time through a second communication interface from among the plurality of communication interfaces, and
transmit the DNS query to the first DNS server through the first communication interface when the first DNS resolution time does not exist within the second threshold time range.

18. The apparatus of claim 17, wherein the controller is further configured to:
if the first DNS resolution time exists within the second threshold time range, transmit the DNS query to the first DNS server and a second DNS server corresponding to the second communication interface through the first communication interface and the second communication interface, respectively.

* * * * *